United States Patent
Jung et al.

(10) Patent No.: US 12,328,782 B2
(45) Date of Patent: Jun. 10, 2025

(54) METHOD AND APPARATUS FOR SUPPORTING DUAL CONNECTIVITY FOR MULTI-USIM UE IN NEXT-GENERATION MOBILE COMMUNICATION SYSTEM

(71) Applicant: Samsung Electronics Co., Ltd., Suwon-si (KR)

(72) Inventors: Sangyeob Jung, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 277 days.

(21) Appl. No.: 17/877,140

(22) Filed: Jul. 29, 2022

(65) Prior Publication Data

US 2023/0047050 A1    Feb. 16, 2023

(30) Foreign Application Priority Data

Aug. 5, 2021    (KR) .................. 10-2021-0103101

(51) Int. Cl.
*H04W 76/16*    (2018.01)
*H04W 24/10*    (2009.01)
(Continued)

(52) U.S. Cl.
CPC .......... *H04W 76/16* (2018.02); *H04W 24/10* (2013.01); *H04W 74/0833* (2013.01); *H04W 76/20* (2018.02)

(58) Field of Classification Search
CPC . H04W 74/0833; H04W 24/10; H04W 76/20; H04W 76/16
(Continued)

(56) References Cited

U.S. PATENT DOCUMENTS 9,859,935 B1    1/2018    Agarwal et al.
10,980,074 B2    4/2021    Tsai et al.
(Continued)

FOREIGN PATENT DOCUMENTS

WO    2021/029730 A1    2/2021
WO    2021/066567 A1    4/2021
(Continued)

OTHER PUBLICATIONS

Samsung, Open issues on network switching for Multi-USIM devices, R2-2105437, 3GPP TSG-RAN WG2 Meeting #114-e, e-Meeting, May 11, 2021.
(Continued)

*Primary Examiner* — Peter G Solinsky
(74) *Attorney, Agent, or Firm* — Jefferson IP Law, LLP

(57) ABSTRACT

The disclosure relates to a communication technique for converging Internet of things (IoT) technology with 5th generation (5G) communication systems designed to support a higher data transfer rate beyond 4th generation (4G) systems, and a system therefor. The disclosure may be applied to intelligent services (e.g., smart homes, smart buildings, smart cities, smart cars or connected cars, healthcare, digital education, retail business, security and safety-related services, etc.) on the basis of 5G communication technology and IoT-related technology. A terminal operation method related to each universal subscriber identity module (USIM) when dual connectivity is established for a terminal supporting multi-USIM, and an apparatus therefor are provided.

20 Claims, 13 Drawing Sheets

(51) Int. Cl.
  *H04W 74/0833* (2024.01)
  *H04W 76/20* (2018.01)

(58) Field of Classification Search
  USPC .......................................................... 370/411
  See application file for complete search history.

(56) References Cited

U.S. PATENT DOCUMENTS

| | | | |
|---|---|---|---|
| 2020/0029321 A1 | 1/2020 | Zhang et al. | |
| 2021/0195670 A1* | 6/2021 | Ozturk | H04W 80/02 |
| 2021/0227616 A1 | 7/2021 | Lee et al. | |
| 2022/0104163 A1* | 3/2022 | Kim | H04W 68/005 |
| 2022/0217675 A1* | 7/2022 | Chen | H04W 68/00 |
| 2022/0225377 A1* | 7/2022 | Kim | H04W 52/0216 |
| 2022/0264587 A1* | 8/2022 | Zhang | H04W 76/15 |
| 2022/0312374 A1* | 9/2022 | Ryu | H04W 68/005 |
| 2022/0369172 A1 | 11/2022 | Hwang et al. | |
| 2023/0189212 A1* | 6/2023 | Chen | H04W 68/12 455/458 |

FOREIGN PATENT DOCUMENTS

| | | |
|---|---|---|
| WO | 2021/126631 A1 | 6/2021 |
| WO | 2021/145611 A1 | 7/2021 |

OTHER PUBLICATIONS

Nokia et al., Switching notification procedure for basic switching scenarios for Single RX UE, R2-2105226, 3GPP TSG-RAN WG2 Meeting #114-e, e-Meeting, May 10, 2021.
ZTE Corporation et al., Consideration on the Switching Notification Procedure, R2-2105165, 3GPP TSG-RAN WG2 Meeting #114-e, e-Meeting, May 11, 2021.
International Search Report dated Nov. 1, 2022, issued in International Application No. PCT/KR2022/011170.
ZTE Corporation et al., Consideration on the Switching Notification Procedure, R2-2104243, 3GPP TSG-RAN WG2 Meeting #113bis-e, Apr. 2, 2021, Online, XP052175498.
Samsung, Network switching for Multi-USIM devices during dual connectivity, R2-2107477, 3GPP TSG-RAN WG2 Meeting #115-e, Aug. 6, 2021, Online, XP052034161.
European Search Report dated Oct. 9, 2024, issued in European Application No. 22853361.8.

* cited by examiner

METHOD AND APPARATUS FOR SUPPORTING DUAL CONNECTIVITY FOR MULTI-USIM UE IN NEXT-GENERATION MOBILE COMMUNICATION SYSTEM

CROSS-REFERENCE TO RELATED APPLICATION(S)

This application is based on and claims priority under 35 U.S.C. § 119(a) of a Korean patent application number 10-2021-0103101, filed on Aug. 5, 2021, in the Korean Intellectual Property Office, the disclosure of which is incorporated by reference herein in its entirety.

BACKGROUND

1. Field

The disclosure relates to a method and an apparatus for operating a user equipment (UE) in relation to each universal subscriber identity module (USIM) when dual connectivity is configured for a multi-USIM UE.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" communication system or a "post long term evolution (LTE)" system. The 5G communication system is considered to be implemented in ultrahigh frequency (millimeter (mm) Wave) bands (e.g., 60 gigahertz (GHz) bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an operation to be performed in relation to each base station when a multi-USIM UE is connected to a different base station for each USIM.

Additional aspects will be set forth in part in the description which follows and, in part, will be apparent from the description, or may be learned by practice of the presented embodiments.

In accordance with an aspect of the disclosure, a method performed by a first base station in a communication system is provided. The method includes transmitting, to a second base station, a request message to add the second base station for dual-connectivity (DC), transmitting, to a terminal, a first message including information for the second base station, wherein the terminal includes a first universal subscriber identity module (USIM) and a second USIM, and wherein a communication for the DC is performed based on the first USIM, transmitting, to the terminal, a second message including configuration information on a multi USIM (MUSIM) gap, and transmitting, to the second base station, a third message including the configuration information, wherein scheduling for the terminal is not performed during a period indicated by the configuration information.

In accordance with another aspect of the disclosure, a method performed by a terminal in a communication system is provided. The method includes receiving, from a first base station, a first message including information for a second base station of dual-connectivity (DC), wherein the terminal includes a first universal subscriber identity module (USIM) and a second USIM, and wherein a communication for the DC is performed based on the first USIM, and receiving, from the first base station, a second message including configuration information on a multi USIM (MUSIM) gap, wherein scheduling from both the first base station and the second base station is not monitored during a period indicated by the configuration information.

In accordance with another aspect of the disclosure, a method performed by a second base station in a communication system is provided. The method includes receiving, from a first base station, a request message for adding the second base station to a terminal for dual-connectivity (DC), wherein the terminal includes a first universal subscriber identity module (USIM) and a second USIM, and wherein a communication for the DC is performed based on the first USIM, and receiving, from the first base station, a message including configuration information on a multi USIM (MUSIM) gap, wherein scheduling for the terminal is not performed during a period indicated by the configuration information.

In accordance with another aspect of the disclosure, a first base station in a communication system is provided. The base station includes a transceiver, and at least one processor configured to control the transceiver to transmit, to a second base station, a request message to add the second base station for dual-connectivity (DC), control the transceiver to transmit, to a terminal, a first message including information for the second base station, wherein the terminal includes a first universal subscriber identity module (USIM) and a second USIM, and wherein a communication for the DC is performed based on the first USIM, control the transceiver to transmit, to the terminal, a second message including configuration information on a multi USIM (MUSIM) gap, and control the transceiver to transmit, to the second base station, a third message including the configuration information, wherein scheduling for the terminal is not performed during a period indicated by the configuration information.

In accordance with another aspect of the disclosure, a terminal in a communication system is provided. The terminal includes a transceiver, and at least one processor configured to control the transceiver to receive, from a first base station, a first message including information for a second base station of dual-connectivity (DC), wherein the terminal includes a first universal subscriber identity module (USIM) and a second USIM, and wherein a communication for the DC is performed based on the first USIM, and control the transceiver to receive, from the first base station, a second message including configuration information on a multi USIM (MUSIM) gap, wherein scheduling from both the first base station and the second base station is not monitored during a period indicated by the configuration information.

In accordance with another aspect of the disclosure, a second base station in a communication system is provided. The base station includes a transceiver, and at least one processor configured to control the transceiver to receive, from a first base station, a request message for adding the second base station to a terminal for dual-connectivity (DC), wherein the terminal includes a first universal subscriber identity module (USIM) and a second USIM, and wherein a communication for the DC is performed based on the first USIM, and control the transceiver to receive, from the first base station, a message including configuration information on a multi USIM (MUSIM) gap, wherein scheduling for the terminal is not performed during a period indicated by the configuration information.

An embodiment is advantageous in that, when a UE has connection configured with different base stations based on different USIMs, the UE can perform an appropriate operation, such as measurement or monitoring, related to another base station while maintaining RRC connection with one base station.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description of the disclosure, a detailed description of known functions or configurations incorporated herein will be omitted when it is determined that the description may make the subject matter of the disclosure unnecessarily unclear. Hereinafter, embodiments will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards. In the disclosure, the term "eNB" may be interchangeably used with the term "gNB". That is, a base station described as "eNB" may indicate "gNB".

Figure 1:
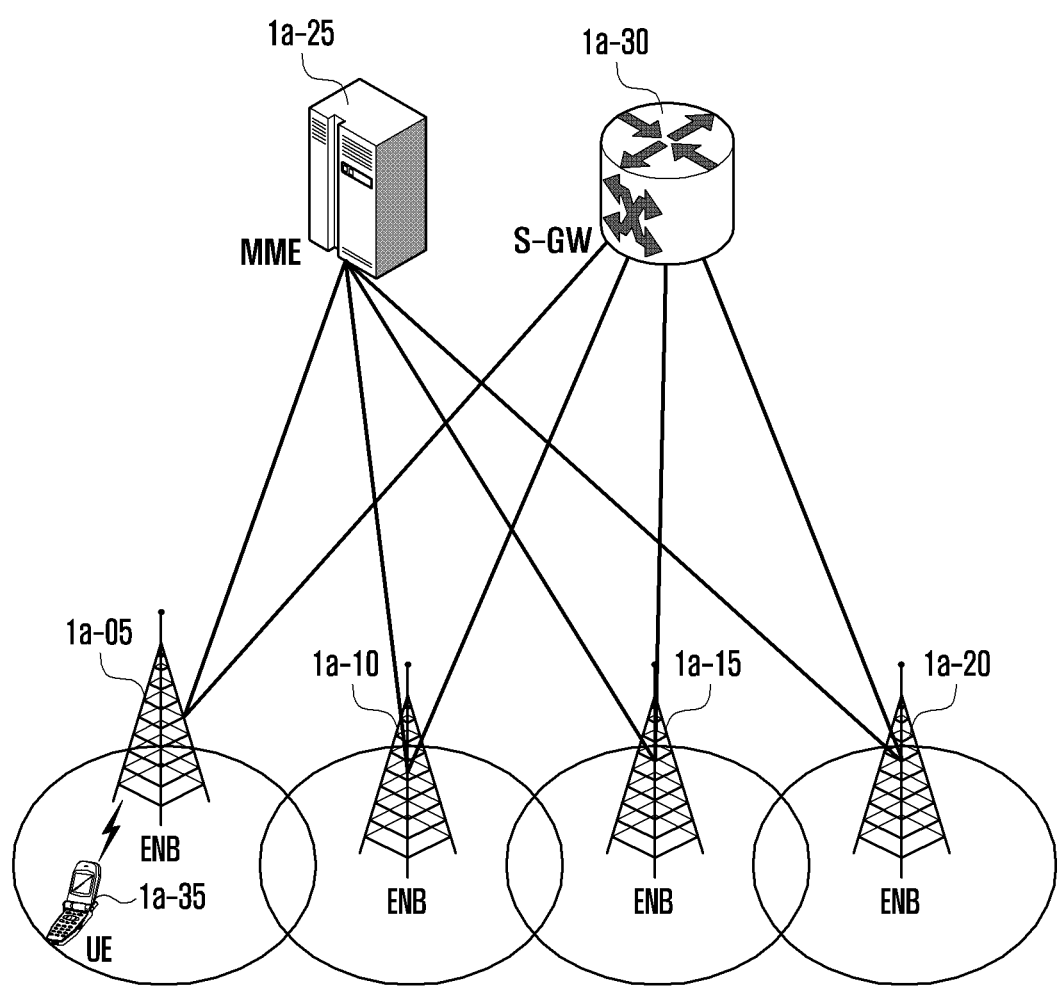
FIG. 1 illustrates the structure of an LTE system according to an embodiment of the disclosure.

FIG. 1 illustrates the structure of an LTE system according to an embodiment of the disclosure.

Referring to FIG. 1, a radio access network of an LTE system may include next-generation base stations (evolved node Bs) (hereinafter ENBs, node Bs, or the base stations) 1a-05, 1a-10, 1a-15, and 1a-20, a mobility management entity (MME) 1a-25, or a serving gateway (S-GW) 1a-30. A user equipment (hereinafter UE or terminal) 1a-35 may access an external network through the ENBs 1a-05 to 1a-20 or S-GW 1a-30.

Referring to FIG. 1, the ENBs 1a-05 to 1a-20 may correspond to an existing node B of a UMTS system. The ENBs are connected to the UE 1a-35 through a radio channel, and may perform a more complicated role than the existing node B. In the LTE system, since all user traffic pertaining to real-time service, such as voice over IP (VoIP), via the Internet protocol, is serviced through a shared channel, a device that performs scheduling by collecting state information, such as buffer states, available transmit power states, and channel states of UEs, is required, and ENBs 1a-05 to 1a-20 may be in charge of the scheduling of the device. One ENB controls multiple cells. In order to implement a transmission rate of 100 Mbps, the LTE system may use orthogonal frequency division multiplexing (hereinafter, referred to as OFDM) as a radio access technology in the bandwidth of 20 MHz. In addition, the LTE system adopts an adaptive modulation & coding (hereinafter, referred to as AMC) scheme for determining a modulation scheme and a channel coding rate based on the channel state of the UE. The S-GW 1a-30 may be a device for providing a data bearer, and may generate or remove a data bearer under the control of the MME 1a-25. The MME may be in charge of various control functions in addition to a mobility management function for the UE, and may be connected to multiple base stations.

Figure 2:
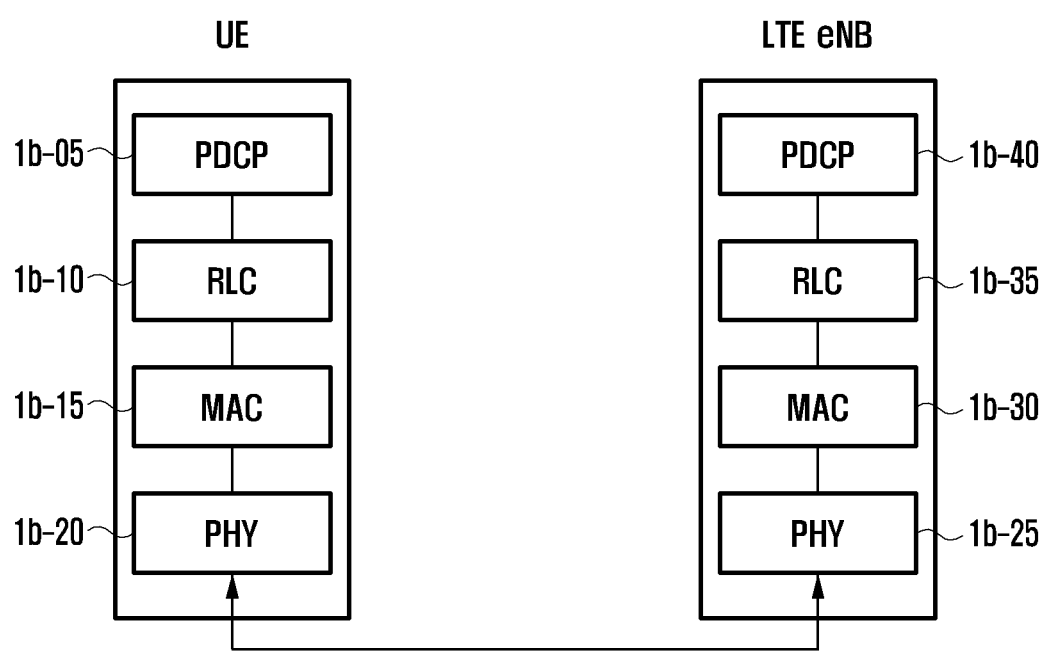
FIG. 2 illustrates a radio protocol structure in an LTE system according to an embodiment of the disclosure.

FIG. 2 illustrates a radio protocol structure in an LTE system according to an embodiment of the disclosure.

Referring to FIG. 2, the radio protocol of the LTE system may include packet data convergence protocols (PDCPs) 1b-05 and 1b-40, radio link controls (RLCs) 1b-10 and 1b-35, and medium access controls (MACs) 1b-15 and 1b-30, in a UE and an ENB, respectively. The packet data convergence protocols (PDCPs) 1b-05 and 1b-40 are used to perform operations, such as IP header compression/reconstruction. The main functions of PDCPs are summarized as follows.

- Header compression and decompression: robust header compression (ROHC) only
- Transfer of user data
- In-sequence delivery of upper layer protocol data units (PDUs) at PDCP re-establishment procedure for RLC AM
- Sequence reordering (for split bearers in DC (only support for RLC AM): PDCP PDU routing for transmission and PDCP PDU reordering for reception)
- Duplicate detection of lower layer SDUs at PDCP re-establishment procedure for RLC AM
- Retransmission of PDCP SDUs at handover and, for split bearers in DC, of PDCP PDUs at PDCP data-recovery procedure, for RLC AM)
- Ciphering and deciphering
- Timer-based service data unit (SDU) discard in uplink The radio link control (hereinafter referred to as RLC) 1b-10 and 1b-35 may perform an ARQ operation and the like by reconfiguring a PDCP protocol data unit (PDU) to an appropriate size. The main functions of RLC are summarized below.

- Transfer of upper layer PDUs
- ARQ function (Error correction through ARQ (only for AM data transfer))
- Concatenation, segmentation and reassembly of RLC SDUs (only for UM and AM data transfer)
- Re-segmentation of RLC data PDUs (only for AM data transfer)
- Reordering of RLC data PDUs (only for UM and AM data transfer)

Duplicate detection (only for UM and AM data transfer)
Protocol error detection (only for AM data transfer)
RLC SDU discard (only for UM and AM data transfer)
RLC re-establishment The MACs 1b-15 and 1b-30 are connected to multiple RLC layer devices configured in one UE, and may perform an operation of multiplexing RLC PDUs to MAC PDUs and de-multiplexing RLC PDUs from MAC PDUs. The main functions of MAC are summarized as follows.

Mapping between logical channels and transport channels
    Multiplexing/de-multiplexing of MAC SDUs belonging to one or different logical channels into/from transport blocks (TB) delivered to/from the physical layer on transport channels
    Scheduling information reporting
    Error correction through HARQ
    Priority handling between logical channels of one UE
    Priority handling between UEs by means of dynamic scheduling
    Multimedia broadcast multicast service (MBMS) identification
    Transport format selection
    Padding Physical layers 1b-20 and 1b-25 may perform operations of channel coding and modulating upper layer data, forming the upper layer data into an OFDM symbol, transmitting the OFDM symbol through a radio channel, or of demodulating an OFDM symbol received through a radio channel, channel-decoding the OFDM symbol, and transmitting the OFDM symbol to an upper layer.

Figure 3:
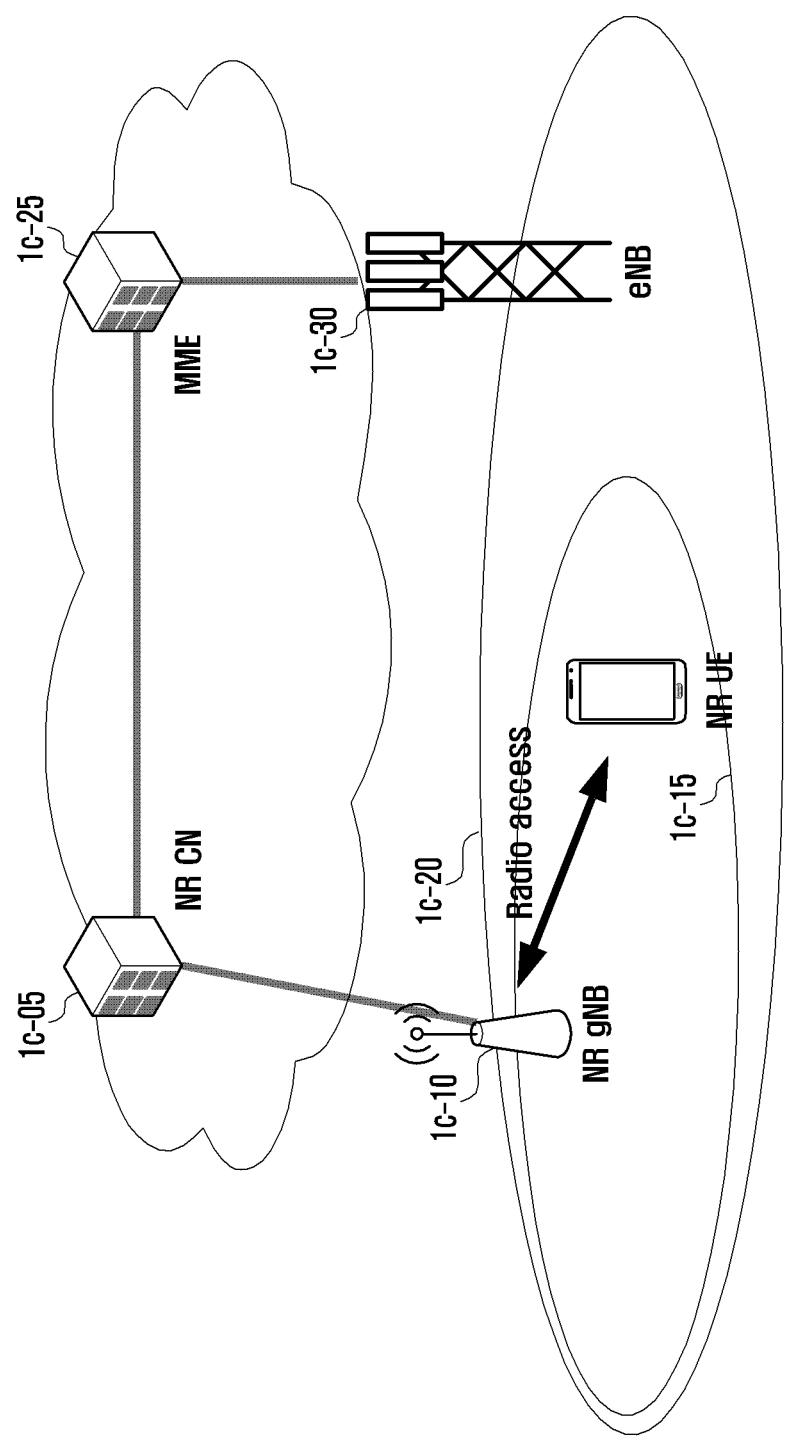
FIG. 3 illustrates the structure of a next-generation mobile communication system according to an embodiment of the disclosure.

FIG. 3 illustrates the structure of a next-generation mobile communication system according to an embodiment of the disclosure.

Referring to FIG. 3, a radio access network of a next-generation mobile communication system (hereinafter referred to as NR or 5G) may include a next-generation base station (new radio node B) (hereinafter referred to as an NR gNB, or NR base station) 1c-10 and a new radio core network (NR CN) 1c-05. A user equipment (a new radio user equipment) (hereinafter referred to as NR UE or a terminal) 1c-15 may access an external network via an NR gNB 1c-10 and an NR CN 1c-05.

Referring to FIG. 3, the NR gNB 1c-10 corresponds to an evolved node B (eNB) of the existing LTE system. The NR gNB may be connected to an NR UE 1c-15 via a radio channel, and may provide an excellent service as compared to the existing node B. In a next-generation mobile communication system, since all types of user traffic may be serviced through a shared channel, there is a need for a device for performing scheduling by collecting state information, such as buffer states, available transmission power states, and channel states of UEs. Further, the NR gNB 1c-10 may be in charge of the scheduling of the device. One NR gNB typically controls multiple cells. In order to implement ultra-high speed data transmission as compared to the current LTE, the NR gNB may have the existing maximum bandwidth or more, and may additionally employ beam-forming technology using orthogonal frequency division multiplexing (hereinafter referred to as OFDM) as a radio access technology. In addition, the NR gNB adopts an adaptive modulation & coding (AMC) scheme that determines a modulation scheme and a channel coding rate based on the channel state of a UE. The NR CN 1c-05 performs functions, such as mobility support, bearer configuration, QoS configuration, and the like. The NR CN may be a device that is in charge of various control functions in addition to a mobility management function for a UE, and may be connected to multiple base stations. In addition, the next-generation mobile communication system may also operate in conjunction with the existing LTE system, and the NR CN may be connected to an MME 1c-25 via a network interface. The MME may be connected to an eNB 1c-30, that is, to the existing base station.

Figure 4:
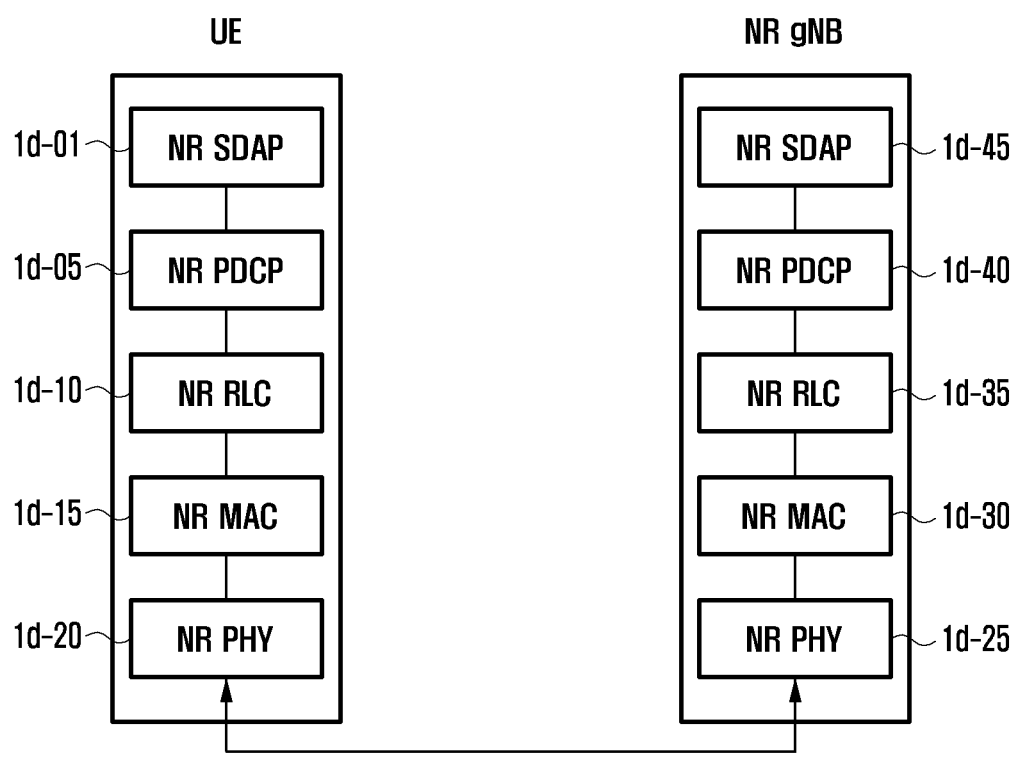
FIG. 4 illustrates a radio protocol structure of a next-generation mobile communication system according to an embodiment of the disclosure.

FIG. 4 illustrates a radio protocol structure of a next-generation mobile communication system according to an embodiment of the disclosure.

Referring to FIG. 4, the radio protocol of the next-generation mobile communication system includes NR SDAPs 1d-01 and 1d-45, NR PDCPs 1d-05 and 1d-40, NR RLCs 1d-10 and 1d-35, and NR MACs 1d-15 and 1d-30, in a UE and an NR base station, respectively.

The main functions of the NR SDAPs 1d-01 and 1d-45 may include some of the following functions.

Transfer of user plane data
    Mapping between a QoS flow and a data bearer (DRB) for both uplink (UL) and downlink (DL)
    Marking QoS flow ID in both DL and UL packets
    Mapping a reflective QoS flow to a DRB for uplink SDAP PDUs (reflective QoS flow to DRB mapping for the UL SDAP PDUs)

In an embodiment, with regard to the service data adaptation protocol (SDAP) layer device, the UE may be configured with, through a radio resource control (RRC) message, whether to use the header of the SDAP layer device or the function of the SDAP layer device for each PDCP layer device, for each bearer, or for each logical channel. Further, when the SDAP header is configured, the UE may indicate to update or reconfigure mapping information for uplink and downlink QoS flows and data bearers by using the NAS QoS reflective setting 1-bit indicator (NAS reflective QoS) and the AS QoS reflective setting 1-bit indicator (AS reflective QoS) of the SDAP header. The SDAP header may include QoS flow ID information indicating QoS. The QoS information may be used as data processing priority and scheduling information to support a smooth service.

The main functions of the NR PDCPs 1d-05 and 1d-40 may include some of the following functions.

Header compression and decompression: ROHC only
    Transfer of user data
    In-sequence delivery of upper layer PDUs
    Out-of-sequence delivery of upper layer PDUs
    Sequence reordering (PDCP PDU reordering for reception)
    Duplicate detection of lower layer SDUs
    Retransmission of PDCP SDUs
    Ciphering and deciphering
    Timer-based SDU discard in uplink In the above, the reordering function of the NR PDCP device may include a function of sequentially reordering PDCP PDUs, received from a lower layer, based on a PDCP sequence number (SN), and a function of transmitting data to an upper layer in the reordered sequence. Alternatively, the reordering function of the NR PDCP device may include a function of directly transmitting data to an upper layer without taking the sequence into consideration, a function of reordering the sequence and recording lost PDCP PDUs, a function of providing a state report on the lost PDCP PDUs to a transmission side, and a function of requesting retransmission of the lost PDCP PDUs.

The main functions of the NR RLCs 1d-10 and 1d-35 may include some of the following functions.

Transfer of upper layer PDUs
    In-sequence delivery of upper layer PDUs
    Out-of-sequence delivery of upper layer PDUs Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment In the above, the in-sequence delivery (or ID) function of the NR RLC device refers to a function of transmitting RLC SDUs, received from a lower layer, to an upper layer in sequence. In an embodiment, the in-sequence delivery function of the NR RLC device may include, when one RLC SDU is originally segmented into multiple RLC SDUs and received, a function of reassembling and transmitting the multiple RLC SDUs, a function of reordering the received RLC PDUs based on an RLC sequence number (SN) or PDCP sequence number (SN), a function of reordering the sequence and recording lost RLC PDUs, a function of providing a state report on the lost RLC PDUs to a transmission side, a function of requesting retransmission of the lost RLC PDUs, a function of sequentially transmitting only RLC SDUs prior to the lost RLC SDU to an upper layer when there is a lost RLC SDU, a function of sequentially transmitting all the RLC SDUs received before a predetermined timer starts to an upper layer when the predetermined timer has expired even if there is a lost RLC SDU, or a function of sequentially transmitting all RLC SDUs received so far to an upper layer when the predetermined timer has expired even when there is a lost RLC SDU. Further, in the above, the RLC PDUs may be processed in a sequence in which the RLC PDUS are received (a sequence number, regardless of the sequence of sequence numbers, or in a sequence of arrival), and may be transmitted to a PDCP device in out-of-sequence delivery. The function may include receiving segments stored in a buffer or segments to be received later, reconfiguring the segments in one complete RLC PDU, processing the RLC PDU, and transmitting the RLC PDU to the PDCP device. The NR RLC layer may not include a concatenation function, and the concatenation function may be performed by the NR MAC layer, or may be replaced by a multiplexing function of the NR MAC layer.

In another embodiment, the out-of-sequence delivery function of the NR RLC device may include a function of directly transmitting the RLC SDUs, received from the lower layer, to an upper layer regardless of the sequence thereof. The out-of-sequence delivery function of the RLC device may include, when one RLC SDU has been originally segmented into multiple RLC SDUs and received, a function of reassembling the multiple RLC SDUs and transmitting the same, and a function of storing the RLC SN or PDCP SN of the received RLC PDUs, ordering the sequence, and recording the lost RLC PDUs.

In yet another embodiment, the NR MACs 1d-15 and 1d-30 may be connected to multiple NR RLC layer devices configured in one UE, and the main function of the NR MAC may include some of the following functions.

Mapping between logical channels and transport channels
Multiplexing/de-multiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layers 1d-20 and 1d-25 may perform operations of channel-coding and modulating upper layer data, forming the upper layer data into an OFDM symbol, transmitting the OFDM symbols via a radio channel or demodulating and channel decoding of the OFDM symbols received via the radio channel, and transferring the OFDM symbol to an upper layer.

Figure 5:
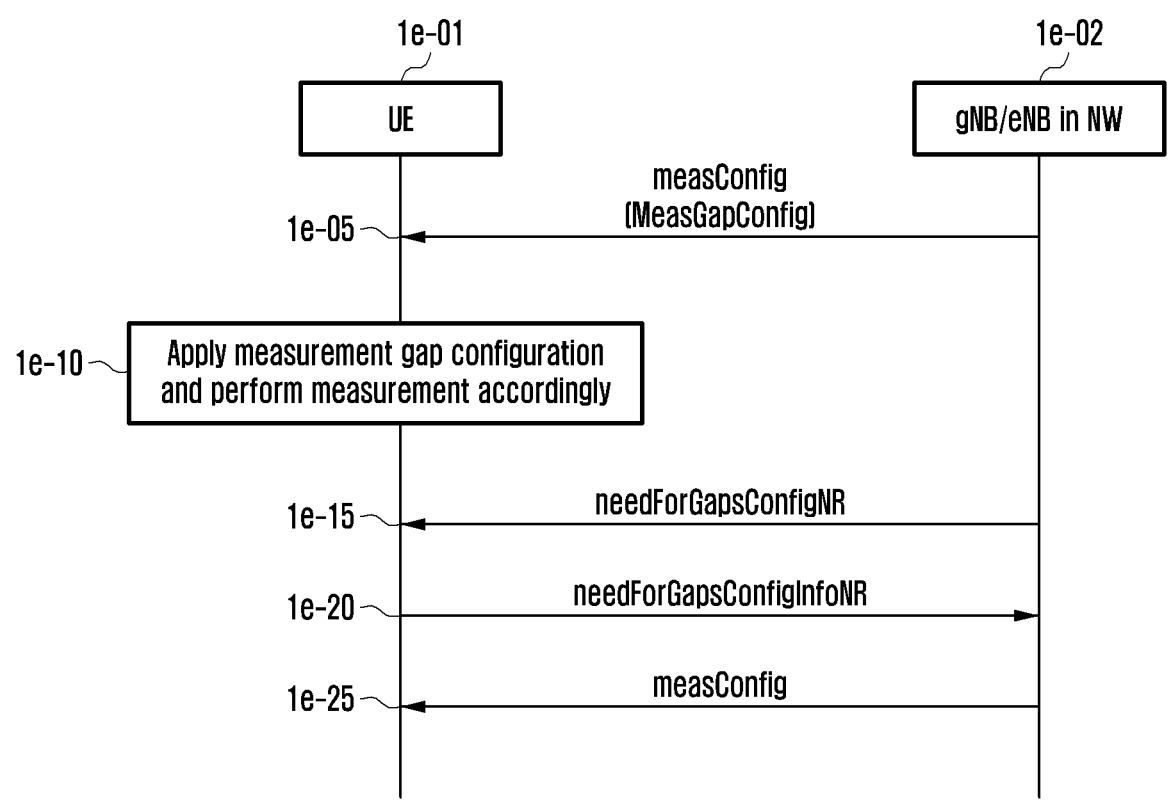
FIG. 5 is a flow diagram illustrating a process in which a UE in an RRC connected mode (RRC_CONNECTED) performs measurement based on measurement configuration information, which is configured from a base station, according to an embodiment of the disclosure.

FIG. 5 is a flow diagram illustrating a process in which a UE in an RRC connected mode (RRC_CONNECTED) performs measurement based on measurement configuration information, which is configured from a base station, according to an embodiment of the disclosure.

Referring to FIG. 5, a UE 1e-01 may receive, from a base station 1e-02, a predetermined RRC message (e.g., an RRC connection resume message (RRCResume) or an RRC connection reconfiguration message (RRCReconfiguration)) having measurement configuration information (measConfig) contained therein (indicated by reference numeral 1e-05). The measurement configuration information may refer to measurement configuration information applied by the UE in the RRC connected mode (RRC_CONNECTED). The measurement configuration information may include measurement gap configuration information (MeasGapConfig).

With regard to the MeasGapConfig, gap configuration information (GapConfig) may be configured for each FR (e.g., gapFR1 or gapFR2), and UE gap configuration information (gapUE) may be configured. The MeasGapConfig may include at least one of the following parameters, and the definition of each parameter may be as follows.

```
MeasGapConfig ::=           SEQUENCE {
    gapFR2                  SetupRelease { GapConfig }
    OPTIONAL,       -- Need M
    ...,
    [[
    gapFR1                  SetupRelease { GapConfig }
    OPTIONAL,       -- Need M
    gapUE                   SetupRelease { GapConfig }
    OPTIONAL        -- Need M
    ]]
    }
    GapConfig ::=           SEQUENCE {
    gapOffset               INTEGER (0..159),
    mgl                     ENUMERATED {ms1dot5, ms3, ms3dot5, ms4,
    ms5dot5, ms6},
    mgrp                    ENUMERATED {ms20, ms40, ms80, ms160},
    mgta                    ENUMERATED {ms0, ms0dot25, ms0dot5},
    ...,
```

-continued

```
[[
    refServCellIndicator        ENUMERATED {pCell, pSCell, mcg-
FR2}                OPTIONAL    -- Cond NEDCorNRDC
]],
[[
    refFR2ServCellAsyncCA-r16 ServCellIndex
OPTIONAL,       -- Cond AsyncCA
    mgl-r16             ENUMERATED {ms10, ms20}
OPTIONAL        -- Cond PRS
]]
}
``` gapFR1
Indicates measurement gap configuration that applies to FR1 only. In (NG)EN-DC, gapFR1 cannot be set up by NR RRC (i.e. only LTE RRC can configure FR1 measurement gap). In NE-DC, gapFR1 can only be set up by NR RRC (i.e. LTE RRC cannot configure FR1 gap). In NR-DC, gapFR1 can only be set up in the measConfig associated with MCG. gapFR1 cannot be configured together with gapUE. The applicability of the FR1 measurement gap is according to Table 9.1.2-2 and Table 9.1.2-3 in TS 38.133 [14],
gapFR2
Indicates measurement gap configuration applies to FR2 only. In (NG)EN-DC or NE-DC, gapFR2 can only be set up by NR RRC (i.e. LTE RRC cannot configure FR2 gap). In NR-DC, gapFR2 can only be set up in the measConfig associated with MCG. gapFR2 cannot be configured together with gapUE. The applicability of the FR2 measurement gap is according to Table 9.1.2-2 and Table 9.1.2-3 in TS 38.133 [14].
gapUE
Indicates measurement gap configuration that applies to all frequencies (FR1 and FR2). In (NG)EN-DC, gapUE cannot be set up by NR RRC (i.e. only LTE RRC can configure per UE measurement gap). In NE-DC, gapUE can only be set up by NR RRC (i.e. LTE RRC cannot configure per UE gap). In NR-DC, gapUE can only be set up in the measConfig associated with MCG. If gapUE is configured, then neither gapFR1 nor gapFR2 can be configured. The applicability of the per UE measurement gap is according to Table 9.1.2-2 and Table 9.1.2-3 in TS 38.133 [14].
gapOffset
Value gapOffset is the gap offset of the gap pattern with MGRP indicated in the field mgrp. The value range is from 0 to mgrp-1.
mgl
Value mgl is the measurement gap length in ms of the measurement gap. The measurement gap length is according to in Table 9.1.2-1 in TS 38.133 [14]. Value ms1dot5 corresponds to 1.5 ms, ms3 corresponds to 3 ms and so on. If mgl-r16 is signalled, UE shall use mgl-r16 (with suffix) and ignore the mgl (without suffix).
mgrp
Value mgrp is measurement gap repetition period in (ms) of the measurement gap. The measurement gap repetition period is according to Table 9.1.2-1 in TS 38.133 [14].
mgta
Value mgta is the measurement gap timing advance in ms. The applicability of the measurement gap timing advance is according to clause 9.1.2 of TS 38.133 [14]. Value ms0 corresponds to 0 ms, ms0dot25 corresponds to 0.25 ms and ms0dot5 corresponds to 0.5 ms. For FR2, the network only configures 0 ms and 0.25 ms.
refFR2ServCellAsyncCA
Indicates the FR2 serving cell identifier whose SFN and subframe is used for FR2 gap calculation for this gap pattern with asynchronous CA involving FR2 carrier(s).
refServCellIndicator
Indicates the serving cell whose SFN and subframe are used for gap calculation for this gap pattern. Value pCell corresponds to the PCell, pSCell corresponds to the PSCell, and mcg-FR2 corresponds to a serving cell on FR2 frequency in MCG.

The MeasGapConfig may have the following characteristics.

The base station 1e-02 may determine whether to set up or release GapConfig, which is measurement gap configuration information configured for the UE 1e-01 by the base station 1e-02. The UE may not request the base station to set up or release GapConfig.

When the base station 1e-02 has configured a UE gap (gapUE) for the UE 1e-01 based on GapConfig, each parameter included in GapConfig may not be configured to have two or more values. That is, with regard to GapConfig, gapOffset, mgl, mgta, and the like may be configured to have only one value.

When the base station 1e-02 configures the FR1 gap (gapFR1) and/or the FR2 gap (gapFR2) for the UE 1e-01 based on GapConfig, each parameter included in each GapConfig may not be configured to have two or more values. That is, in each GapConfig, gapOffset, mgl, mgta, and the like may be configured to have only one value.

In operation 1e-10, the RRC connected mode UE 1e-01 may perform measurement by applying measurement gap configuration information. The time point at which the measurement is performed may be determined as follows.

If gapFR1 is set to setup:
If an FR1 measurement gap configuration is already set up, the corresponding FR1 measurement gap configuration information may be released (if an FR1 measurement gap configuration is already setup, release the FR1 measurement gap configuration);

In operation 1e-10, the FR1 measurement gap configuration information indicated by the received measGapConfig may be setup. Specifically, the first subframe and SFN each having a gap occurring therein need to satisfy condition 1 below (setup the FR1 measurement gap configuration indicated by the measGapConfig in accordance with the received gapOffset, i.e., the first subframe of each gap occurs at an SFN and subframe meeting the following condition 1:

<Condition 1>

SFN mod T=FLOOR(gapOffset/10);

subframe=gapOffset mod 10;

with T=MGRP/10 as defined in TS 38.133;

mgta may be applied to a gap generated by satisfying the above conditions. The UE may apply timing advance, which is indicated by mgta, to a gap timing point occurring when the above condition is satisfied. The UE may start the measurement earlier by the mgta than the gap subframe occurrence time point (apply the specified timing advance mgta to the gap occurrences calculated above (i.e., the UE starts the measurement mgta ms before the gap subframe occurrences));

else if gapFR1 is set to release:

FR1 measurement gap configuration information may be released (release the FR1 measurement gap configuration);

if gapFR2 is set to setup:

If an FR2 measurement gap configuration is already set up, the corresponding FR2 measurement gap configuration information may be released (if an FR2 measurement gap configuration is already setup, release the FR2 measurement gap configuration);

In operation 1e-10, the FR2 measurement gap configuration information indicated by the received measGapConfig may be setup. Specifically, the first subframe and SFN each having a gap occurring therein need to satisfy condition 1 below (setup the FR2 measurement gap configuration indicated by the measGapConfig in accordance with the received gapOffset, i.e., the first subframe of each gap occurs at an SFN and subframe meeting the above condition 1:

mgta may be applied to a gap generated by satisfying the above conditions. The UE may apply timing advance, which is indicated by mgta, to a gap timing point occurring when the above condition is satisfied. The UE may start the measurement earlier by the mgta than the gap subframe occurrence time point (apply the specified timing advance mgta to the gap occurrences calculated above (i.e. The UE starts the measurement mgta ms before the gap subframe occurrences));

else if gapFR2 is set to release:

FR2 measurement gap configuration information may be released (release the FR2 measurement gap configuration);

If gapUE is set to setup:

If a measurement gap configuration for each UE is already set up, the measurement gap configuration information for each UE may be released (if a per UE measurement gap configuration is already setup, release the per UE measurement gap configuration);

In operation 1e-10, UE-specific measurement gap configuration information indicated by the received measGapConfig may be setup. Specifically, the first subframe and SFN each having a gap occurring therein need to satisfy condition 1 below (setup the per UE measurement gap configuration indicated by the measGapConfig in accordance with the received gapOffset, i.e., the first subframe of each gap occurs at an SFN and subframe meeting the above condition 1:

mgta may be applied to a gap generated by satisfying the above conditions. The UE may apply the timing advance, which is indicated by mgta, to a gap timing point occurring when the above condition is satisfied. The UE may start measurement earlier by the mgta than the gap subframe occurrence time point (apply the specified timing advance mgta to the gap occurrences calculated above (i.e., the UE starts the measurement mgta ms before the gap subframe occurrences));

else if gapUE is set to release:

the per UE measurement gap configuration may be released (release the per UE measurement gap configuration);

In operation 1e-15, the base station 1e-02 may transmit, to the UE 1e-01, a predetermined RRC message (e.g., an RRC connection resumption message (RRCResume) or an RRC connection reconfiguration message (RRCReconfiguration) including needForGapsConfig (which is configuration information indicating to report measurement gap requirement information for NR target bands, and one or multiple NR frequency band values (FreqBandIndicatiorNR) are included in requestedTargetBandFilterNR contained in needForGapsConfig). When needForGapsConfigNR is included in the predetermined RRC message, the UE may perform the following procedure.

if needForGapsConfigNR is set to setup:

The UE may consider itself to be configured to provide the measurement gap requirement information of NR target bands to the base station;

else,

The UE may consider itself not to be configured to provide, to the base station, the measurement gap requirement information of NR target bands;

In operation 1e-20, when the UE 1e-01 is configured to provide measurement gap requirement information for NR target bands to the base station 1e-02, the UE may transmit, to the base station, a predetermined RRC message including needForGapsInfoNR (information indicating measurement gap requirement information for NR target bands) (for example, an RRC connection resumption completion message (RRCResumeComplete) or an RRC connection reconfiguration complete message (RRCReconfigurationComplete), as a response message to the RRC message received in operations 1e-15,) may be transmitted to the base station. The UE may include the following information in needForGapsInfoNR.

For each NR serving cell, information on the gap requirement for intra-frequency measurement may be included in intraFreq-needForGap (include intraFreq-needForGap and set the gap requirement information of intra-frequency measurement for each NR serving cell). Specifically, intraFreq-needForGap may include an identifier (servCellId) for each NR serving cell and an indicator (gapindicationIntra) indicating whether a gap is required in the corresponding NR serving cell.

If requestedTargetBandFilterNR is configured, the UE may include gap requirement information in interFreq-needForGap for each supportable NR band, which is included in requestedTargetBandFilterNR. Otherwise, the UE may include gap requirement information in interFreq-needForGap for each supportable NR band (if requestedTargetBandFilterNR is configured, for each supported NR band that is also included in requestedTargetBandFilterNR, include an entry in interFreq-needForGap and set the gap requirement information for that band; otherwise, include an entry in interFreq-needForGap and set the corresponding gap requirement information for each supported NR band).

The needForGapsInfoNR may have the following characteristics.

The UE 1e-01 notifies the base station 1e-02 of only whether or not a measurement gap is required for each frequency band or for each cell.

In operation 1e-25, the base station 1e-02 may transmit, to the UE 1e-01, a predetermined RRC message (e.g., an RRC connection resumption message (RRCResume) or an RRC connection reconfiguration message (RRCReconfiguration)) in which measurement configuration information (measConfig) is contained. A subsequent operation may be the same as that of the above-described operation.

Figure 6:
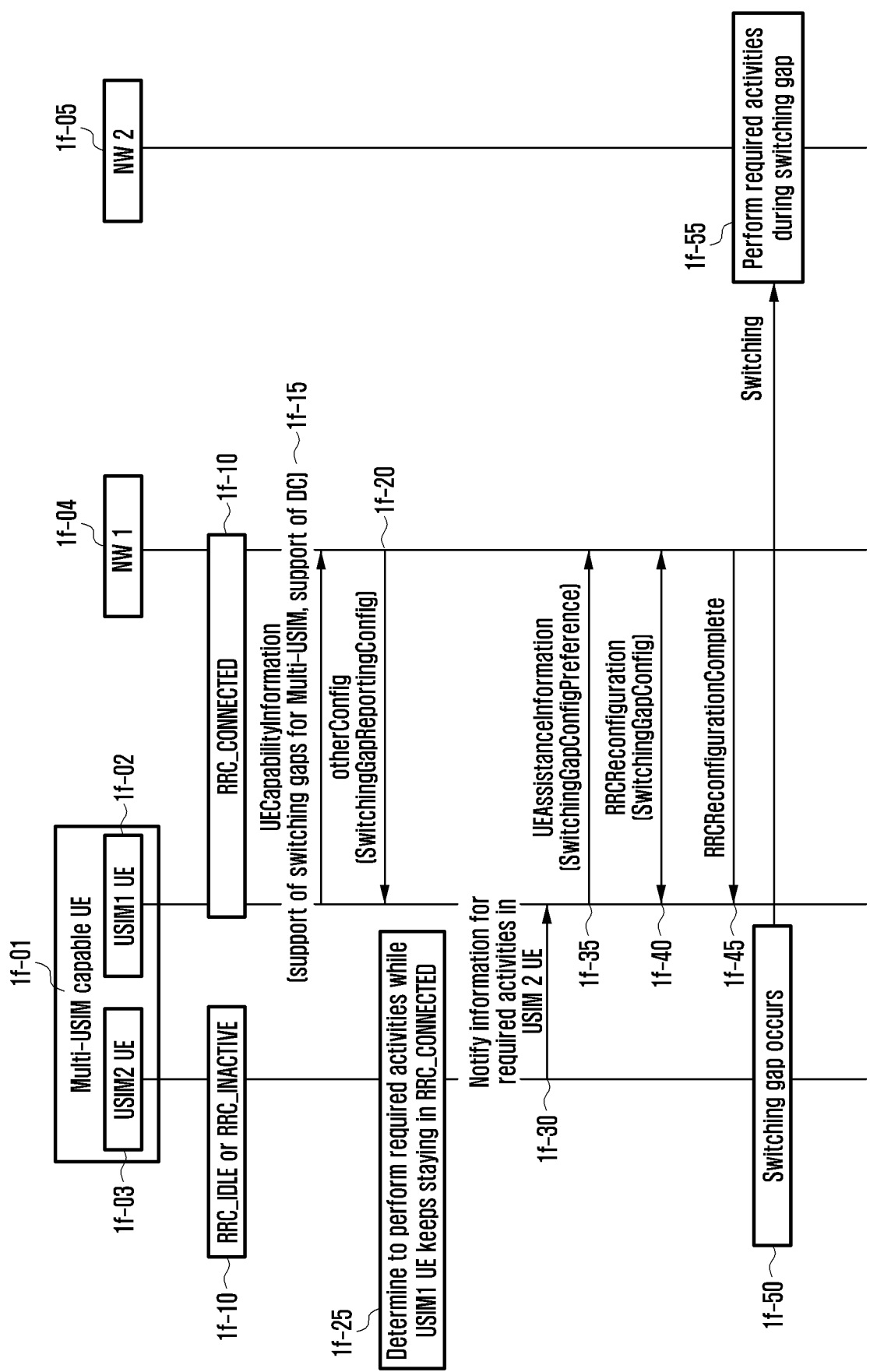
FIG. 6 illustrates an operation in which a UE supporting multiple universal subscriber identity module (USIMs) (multi-USIM UE) performs operations associated with other USIMs while maintaining an RRC connected mode (RRC_CONNECTED) with a base station associated with one USIM according to an embodiment of the disclosure.

FIG. 6 illustrates an operation in which a UE supporting multiple universal subscriber identity module (USIMs) (multi-USIM UE) performs operations associated with other USIMs while maintaining an RRC connected mode (RRC_CONNECTED) with a base station associated with one USIM according to an embodiment of the disclosure.

A multi-USIM UE 1f-01 according to an embodiment may refer to a terminal supporting two or more USIMs. For convenience of description, the disclosure considers a dual-USIM UE supporting two USIMs. A dual-USIM UE has a characteristic of transmitting to only a base station associated with one USIM at a given period of time. On the other hand, the dual-USIM UE may perform reception from a base station associated with one USIM at a given period of time or perform reception from a base station associated with each USIM at the same time.

Referring to FIG. 6, the multi-USIM UE 1f-01 may refer to a terminal in which one device supports multiple USIMs. The multi-USIM UE may refer to a USIM 1 UE 1f-02 when operating in USIM 1, and may refer to a USIM 2 UE 1f-03 when operating in USIM 2. The base station associated with each USIM may recognize the multi-USIM UE as one terminal per USIM UE level rather than recognizing the multi-USIM UE as one terminal.

As an example, base station 1 1f-04 may recognize the USIM 1 UE 1f-02 as one terminal, and base station 2 1f-05 may recognize the USIM 2 UE 1f-03 as one terminal. Hereinafter, in the embodiments, for convenience of description, when a multi-USIM UE performs communication using USIM 1, the multi-USIM UE is referred to as a USIM 1 UE, and when the multi-USIM UE performs communication using USIM 2, the multi-USIM UE is referred to as a USIM 2 UE. The multi-USIM UE may be either the USIM 1 UE or USIM 2 UE depending on which USIM among USIM 1 and USIM 2 is used.

In operation 1f-10, the USIM 1 UE 1f-02 may be in the RRC connected mode (RRC_CONNECTED) by establishing an RRC connection with the base station 1 1f-04. On the other hand, in operation 1f-10, the USIM 2 UE 1f-03 may not establish an RRC connection with the base station 2 1f-05 and thus to be in an RRC idle mode (RRC_IDLE) or an RRC inactive mode (RRC_INACTIVE).

In operation 1f-15, the USIM 1 UE 1f-02 may transmit a UE capability information message (UECapabilityInformation) to the base station 1 1f-04. The UE capability information message may include at least one of the following pieces of information.

An indicator or information element indicating supporting of the multi-USIM

An indicator or information element indicating supporting of a procedure in which the USIM 1 UE 1f-02 performs switching to the USIM 2 UE 1f-03 from the base station 1 1f-04 for leaving the RRC connected mode (support of switching procedure for leaving RRC_CONNECTED state). For example, when the USIM 2 UE 1f-03 establishes or resumes the RRC connection with the base station 2 1f-05 and thus transitions to the RRC connected mode, or when the USIM 2 UE 1f-03 needs to transmit a signal to base station 2 1f-05, it is referred to as a procedure in which the USIM 1 UE 1f-02 notifies the base station 1 1f-04 of desiring to leave the RRC connected mode or notifying of transition to an RRC state (e.g., RRC idle mode or RRC inactive mode), and this may be referred to as a switching procedure without leaving RRC_CONNECTED state.

An indicator or information element indicating supporting of a procedure in which the USIM 1 UE 1f-02 performs switching to the USIM 2 UE 1f-03 while maintaining the RRC connected mode with the base station 1 1f-04 (support of switching procedure without leaving RRC_CONNECTED state). For example, a procedure in which the USIM 2 UE 1f-03 performs an operation related to the base station 2 1f-05 while the USIM 1 UE 1f-02 maintains the RRC connected mode with the base station 1 1f-04 may be referred to as a switching procedure without leaving RRC_CONNECTED state.

An indicator or information element indicating that the USIM 1 UE 1f-02 performs switching to the USIM 2 UE 1f-03 while maintaining the RRC connected mode with the base station 1 1f-04 so as to support switching gaps required to communicate with the base station 2 1f-05 (support of switching gaps for Multi-USIM purpose).

The switching gap may refer to a switching gap per UE level. If the USIM 1 UE 1f-02 supports a switching gap per frequency range (FR) or per frequency, a separate indicator or information element indicating this may be included in the UE capability information message.

In operation 1f-20, the base station 1 1f-04 may transmit a predetermined RRC message including configuration information (SwitchingGapReportingConfig) indicating to report the switching gap information preferred/required for the USIM 1 UE 1f-02 to perform multi-USIM operation. The predetermined RRC message may refer to an RRCReconfiguration message, an RRCResume message, or a new RRC message. Additionally, the SwitchingGapReportingConfig may be contained in otherConfig. The SwitchingGapReportingConfig may be configuration information related to a switching procedure without leaving RRC_CONNECTED state. The SwitchingGapReportingConfig may include at least one of the following.

An indicator or information element indicating whether the USIM 1 UE 1f-02 is allowed to transmit preferred switching gap configuration information while maintaining the RRC connected mode with the base station 1 1f-04 (e.g., SetupRelease)

New Prohibit Timer Value

In case that the base station 1 1f-04 configures or sets up the new prohibit timer value for the USIM 1 UE 1f-02, the USIM 1 UE 1f-02 may drive a new timer with the new prohibit timer value when a procedure for transmitting preferred switching gap configuration information to the base station 1 1f-04 is started, and may transmit a predetermined RRC message including the preferred switching gap configuration information to the base station 1 1f-04.

In operation 1f-25, the USIM 2 UE 1f-03 may determine whether to perform a predetermined operation in the RRC idle mode or the RRC inactive mode. The predetermined operation may be an operation in which the USIM 2 UE 1f-03 is related to the base station 2 1f-05, and may refer to at least one of the following.

Operation 1: The USIM 2 UE 1f-03 may not perform an RRC connection establishment procedure or an RRC connection resume procedure with the base station 2 1f-05, but may perform receiving a signal transmitted by the base station 2 1f-05 or perform an internal operation of the USIM 2 UE based on the reception. For example, the following operation may be performed.

The USIM 2 UE 1f-03 monitors a paging channel or short message associated with the base station 2 1f-05. The USIM 2 UE 1f-03 may monitor a paging occasion every discontinuous reception (DRX) cycle.

The USIM 2 UE 1f-03 performs monitoring for reception of the system information change notification associated with the base station 2 1f-05. The USIM 2 UE 1f-03 may monitor a paging occasion every discontinuous reception (DRX) cycle.

The USIM 2 UE 1f-03 performs cell selection or cell reselection evaluation procedure. As an example, the USIM 2 UE may perform measurement of a serving cell or a neighboring cell as part of a cell selection or cell reselection evaluation procedure.

The USIM 2 UE 1f-03 performs a procedure of selecting a public land mobile network (PLMN)

Operation 2: The USIM 2 UE 1f-03 may not perform an RRC connection establishment procedure or an RRC connection resume procedure with the base station 2 1f-05, but may perform transmission to or reception from the base station 2 1f-05, for example, the following operation.

The USIM 2 UE 1f-03 requests on-demand system information to acquire system information from the base station 2 1f-05 or in an on-demand method Operation 3: The USIM 2 UE 1f-03 in the RRC inactive mode performs an RRC connection resumption procedure with the base station 2 1f-05, but fails to transition to the RRC connected mode. For example, the following operation may be performed.

The USIM 2 UE 1f-03 may receive the RAN paging message transmitted by the base station 2 1f-05, and a UE identifier (inactive-radio network temporary identifier (I-RNTI)) indicating the USIM 2 UE 1f-03 is included in the received RAN paging message. However, the USIM 1 UE 1f-02 may need to continuously perform data transmission or reception to or from the base station 1 1f-04. The USIM 2 UE 1f-03 may transmit, to the base station 2 1f-05, a RRCResumeRequest/1 message containing a busy indication indicating that it cannot respond to the RAN paging message received from the base station 2 1f-05. For reference, busy indication may be contained in resumeCause. In response thereto, the base station 2 1f-05 may transmit an RRCReject or RRCRelease message to the USIM 2 UE 1f-03.

Operation 4: The USIM 2 UE 1f-03 may transition to the RRC connected mode by performing a procedure for establishing or resuming an RRC connection with the base station 2 1f-05. For example, the following operation may be performed.

The USIM 2 UE 1f-03 performs a registration update procedure or RAN notification area update procedure The above-described operation may be a periodic operation, an aperiodic operation, or may refer to a one-time operation.

In operation 1f-30, the USIM 2 UE 1f-03 may notify the USIM 1 UE 1f-02 of pieces of information required to perform the above-described operation in operation 1f-25 in the RRC idle mode or the RRC inactive mode. For reference, the operation 1f-30 may be implemented by the multi-USIM UE 1f-01.

In operation 1f-35, the USIM 1 UE 1f-02 may transmit, to the base station 1 1f-04, a predetermined RRC message containing configuration information (SwitchingGapConfigPreference) for one or multiple preferred switching gap patterns. The predetermined RRC message may refer to UEAssistanceInformation or a new RRC message. Specifically, when at least one of the following conditions is satisfied, the USIM 1 UE 1f-02 may transmit a predetermined RRC message including the SwitchingGapConfigPreference to the base station 1 1f-04.

Condition 1: When a predetermined RRC message including SwitchingGapConfigPreference is not transmitted after SwitchingGapReportingConfig is configured in operation 1f-20

Condition 2: When the currently preferred SwitchingGapConfigPreference is different from the most recently transmitted SwitchingGapConfigPreference Condition 3: When the currently preferred SwitchingGapConfigPreference is different from the currently configured SwitchingGapConfig Condition 4: When the currently preferred SwitchingGapConfigPreference is different from the most recently transmitted SwitchingGapConfigPreference and the above-mentioned new prohibit timer is not running in operation 1f-20

Condition 5: If the currently preferred SwitchingGapConfigPreference is different from the currently configured SwitchingGapConfig, and the new prohibit timer is not running in operation 1f-20

For reference, in operation 1f-35, the USIM 1 UE 1f-02 may start (or restart) a new timer with the new prohibit timer value configured in operation 1f-20, and may transmit a predetermined RRC message including SwitchingGapConfigPreference to the base station 1 1f-04. The SwitchingGapConfigPreference may refer to configuration information different from the measurement configuration information (MeasConfig) of the above-described embodiment. Specifically, one or multiple SwitchingGapConfigPreferences according to an embodiment may have a difference from MeasGapConfig of the above-described embodiment as follows.

SwitchingGapConfigPreference is switching gap configuration information which may be requested by the USIM 1 UE 1f-02 through transmission to the base station 1 1f-04 so that the USIM 2 UE may perform the predetermined operation described above in operation 1f-30.

SwitchingGapConfigPreference may include one or multiple preferred switching gap patterns depending on the operation required in operations 1f-25. Multiple switching gap offset values may be included during one long periodicity (switching gap repetition periodicity) in order to indicate multiple preferred switching gap patterns, and at least one of a switching gap length, switching gap timing advance, or refServCellIndicator (PCell, PSCell, or Serving cell), which are mapped to each switching gap offset, and an indicator indicating whether a periodicity occurs may be included therein. Alternatively, switching gap repetition periodicity, switching gap offset, switching gap length, switching gap timing advance, and refServCellIndicator (PCell or PSCell or Serving cell) for each switching gap pattern may be included therein. Alternatively, a specific gap pattern among multiple switching gap patterns may include an indicator indicating occurrence in one shot not periodic occurrence, or may not include a switching gap repetition periodicity value. Alternatively, one or multiple gap patterns are pre-fixed and thus the gap pattern index value may be included in the SwitchingGapConfigPreference. As an example, gap pattern 1 may be mapped to a specific combination of switching gap repetition periodicity, switching gap offset, switching gap length, switching gap timing advance, and refServCellIndicator.

The units of switching gap repetition periodicity, switching gap length, and switching gap timing advance may refer to one of the units representing time. The units may be expressed in "ms", in units of slots, or in units of subframes. The switching gap offset may be indicated by one of 0 to the value obtained by (switching gap repetition periodicity−1).

SwitchingGapConfigPreference may include one or multiple switching gap patterns for each FR or for each UE, as in MeasGapConfig of the above-described embodiment.

SwitchingGapConfigPreference may be applied for each band, as in NeedForGapInfoNR of the above-described embodiment, but is different in that one or multiple switching gap patterns may be included for each band.

In operation 1f-40, the base station 1 1f-04 may transmit, in response to operation 1f-35, a predetermined RRC message containing one or multiple pieces of switching gap configuration information (SwitchingGapConfig) based on the SwitchingGapConfigPreference requested by the USIM 1 UE 1f-02. The predetermined RRC message may refer to RRCReconfiguration, RRCResume, or a new RRC message. Specifically, the base station 1 may include, in SwitchingGapConfig, permissible (or configurable) information among the received SwitchingGapConfigPreferences in operation 1f-40, or may change (delta) some information and include the same in SwitchingGapConfig.

In operation 1f-45, the USIM 1 UE 1f-02 may transmit a predetermined RRC message to the base station 1 1f-04 in response to the predetermined RRC message received in operation 1f-40. The predetermined RRC message may refer to RRCReconfigurationComplete, RRCResumeComplete, or a new RRC message.

In operation 1f-50, the USIM 1 UE 1f-02 may determine whether one or multiple switching gaps occur through the SwitchingGapConfig, which is received and applied in operation 1f-40. For example, If SwitchingGapConfig is set to Setup:
  If SwitchingGapConfig has already been set up, the USIM 1 UE may release the corresponding SwitchingGapConfig;
  The USIM 1 UE may set up one or multiple switching gap patterns indicated by the SwitchingGapConfig received in operation 1f-40. Specifically, the first subframe and SFN each having a switching gap occurring therein need to satisfy condition 1 below (SFN may be based on PCell or a cell indicated by refServCellIndicator).
<Condition 1>
  SFN mod T=FLOOR(switching gap offset/10);
  subframe=switching gap offset mod 10;
  with T=switching gap repetition periodicity/10 as defined in TS 38.133;
    The switching gap timing advance may be applied to a gap generated by satisfying the above conditions. The UE may apply the timing advance, which is indicated by the switching gap timing advance, to the gap timing point occurring when the above condition is satisfied. The UE may start the measurement earlier by the switching gap timing advance than the gap subframe generation time point.
    The constant value "10" may be fixed to another constant value, or the base station 1 1f-04 may configure the constant value as a specific value in operation 1f-40, or the constant value may be configured to be a specific value requested by the USIM 1 UE 1f-02 in operation 1f-35.
    The USIM 2 UE 1f-03 may perform a predetermined operation by the switching length from the generation of the gap subframe.
  One or multiple gap patterns, having been released in SwitchingGapConfig, may be released;
  When a switching gap is generated in operation 1f-50, the USIM 2 UE 1f-03 may perform at least one of the above-described operations, which are performed in operation 1f-25, during the switching gap length from a time point at which the switching gap is generated, in operation 1f-55. The USIM 1 UE 1f-02 maintains the RRC connected mode with the base station 1 1f-04.

Figure 7:
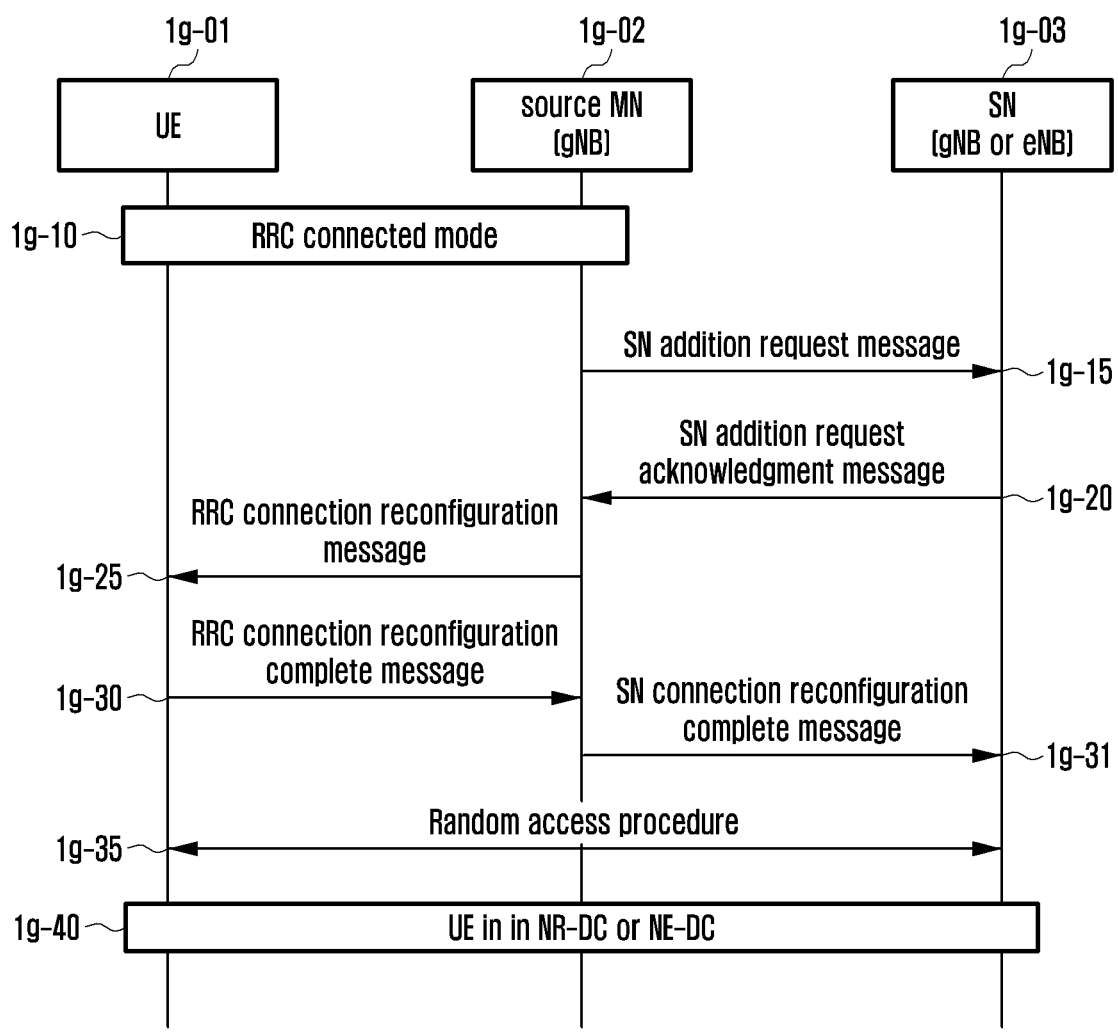
FIG. 7 illustrates an overall flow diagram in which NE-DC or NR-DC is configured according to an embodiment of the disclosure.

FIG. 7 illustrates an overall flow diagram in which NE-DC or NR-DC is configured according to an embodiment of the disclosure.

Referring to FIG. 7, a UE 1g-01 may establish an RRC connection with a primary cell (PCell) (or SpCell of master node) of a source master node (MN) to be in the RRC connected mode (RRC_CONNECTED) (indicated by reference numeral 1g-10). The PCell of the source MN may refer to an NR cell. The PCell of the source MN may be connected to a 5G core network.

In operation 1g-15, a source MN 1g-02 may initiate an SN addition procedure to add a secondary node (SN). In operation 1g-10, the source MN may transmit an SN addition request message (SgNB Addition Request or SN Addition Request) to the SN 1g-03. A PSCell (primary secondary cell or SpCell of Secondary Node) of the source SN may refer to an NR cell or an LTE cell.

In operation 1g-20, the SN 1g-03 may transmit an SN addition request acknowledgment message (SgNB Addition Request Acknowledge or SN Addition Request Acknowledge) to the MN 1g-02 in response to the SN addition request message. The SN addition request acknowledgment message may contain an NR RRC configuration message (e.g., RRCReconfiguration) or an LTE RRC configuration message (e.g., RRCConnectionReconfiguration).

In operation 1g-25, the MN 1g-02 may transmit an RRC connection reconfiguration message (RRCReconfiguration) to the UE 1g-01 through signaling radio bearer (SRB) 1. The RRC connection reconfiguration message may contain an NR RRC configuration message or an LTE RRC configuration message, which is transmitted by the SN 1g-03 in operation 1g-20. The NR RRC configuration message may include cell group configuration information for the SN (SecondaryCellGroup), radio configuration information for the SN (radiobearerConfig and/or radioBearerConfig2), measurement configuration information (measConfig), and the like.

In operation 1g-30, the UE 1g-01 may apply the RRC configuration information, which is contained in the RRC connection reconfiguration message received in operation 1g-25, and may transmit the RRC connection reconfiguration complete message (RRCReconfigurationComplete) to the MN 1g-01 through SRB1.

An NR RRC Response message (e.g., RRCReconfigurationComplete) may be contained in the RRC connection reconfiguration completion message. This may be understood as meaning that the UE 1g-01 includes the NR RRCReconfigurationComplete message regarding the SN 1g-03 in the NR RRCReconfigurationComplete message and transmits the NR RRCReconfigurationComplete message to the MN 1g-02. Alternatively, the LTE RRC Response message (e.g., RRCConnectionReconfigurationComplete) may be contained in the RRC connection reconfiguration completion message. This may be understood as meaning that the UE 1g-01 includes the LTE RRCConnectionReconfigurationComplete message regarding the SN 1g-03 in the NR RRCReconfigurationComplete message and transmits the NR RRCReconfigurationComplete message to the MN 1g-02.

In operation 1g-31, in order to notify the SN 1g-03 that the UE has completed the RRC reconfiguration procedure for the SN, the MN 1g-02 may include the NR RRC Response message, which is received from the UE 1g-02 in operation 1g-30, in an SN completion message (SgNB Reconfiguration Complete or SN Reconfiguration Complete) and transmit the same to the SN 1g-03.

In operation 1g-35, the UE 1g-02 may initiate a random access procedure for the PSCell in the RRC layer. For reference, operations 1g-30 and 1g-31 may be changed to operation 1g-35 in its execution order. The UE 1g-01 may transmit the RRC connection reconfiguration completion message to the MN 1g-02 after initiating or successful completion of the random access procedure for the PSCell.

In operation 1g-40, the UE 1g-02 may operate as NR-DC or NE-DC.

Figure 8:
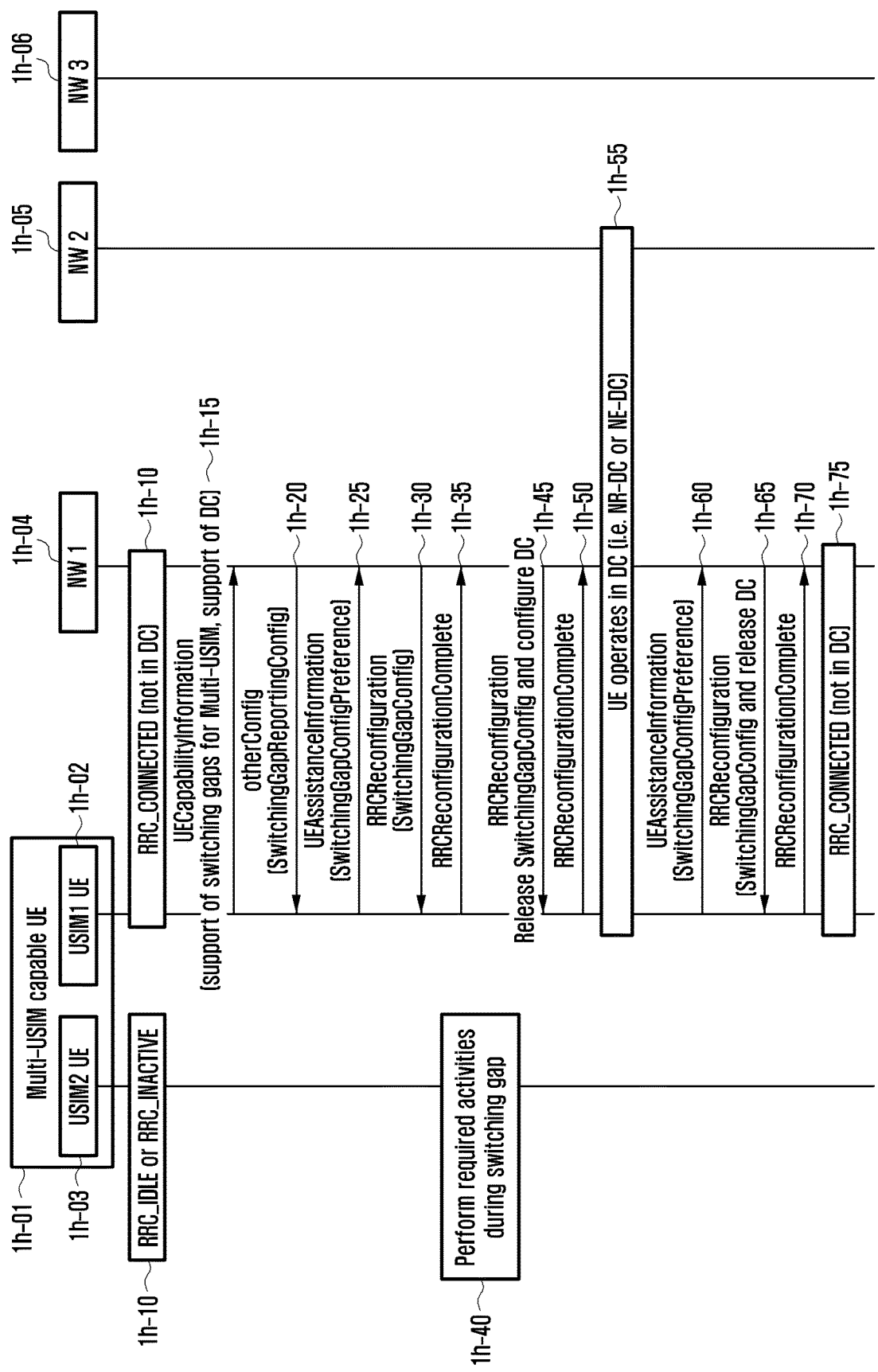
FIG. 8 illustrates an overall flow diagram in which a UE supporting multiple universal subscriber identity module (USIMs) (multi-USIM UE) operates as NE-DC or NR-DC according to an embodiment of the disclosure.

FIG. 8 illustrates an overall flow chart in which a UE supporting multiple universal subscriber identity modules (USIM) (multi-USIM UE) operates as NE-DC or NR-DC according to an embodiment of the disclosure.

A multi-USIM UE 1h-01 according to an embodiment may refer to a terminal supporting two or more USIMs. In the disclosure, for convenience of description, a dual-USIM UE supporting two USIMs is considered. The dual-USIM UE has a characteristic of transmitting only to one or multiple base stations associated with one USIM at a given period of time. On the other hand, the dual-USIM UE may perform reception from a base station associated with one USIM at a given period of time or perform reception from a base station associated with each USIM at the same time.

Referring to FIG. 8, the multi-USIM UE 1h-01 may refer to a terminal in which one device supports multiple USIMs. The multi-USIM UE may refer to a USIM 1 UE 1h-02 when operating in USIM 1, and may refer to a USIM 2 UE 1h-03 when operating in USIM 2. The base station associated with each USIM may recognize the multi-USIM UE as one terminal per USIM UE level rather than recognizing the multi-USIM UE as one terminal. As an example, base station 1 1h-04 and base station 2 1h-05 may recognize the USIM 1 UE 1h-02 as one terminal, and base station 3 1h-06 may recognize the USIM 2 UE 1h-03 as one terminal. Hereinafter, in the embodiments, for convenience of description, when a multi-USIM UE performs communication using USIM 1, the multi-USIM UE may be referred to as a USIM 1 UE, and when the multi-USIM UE performs communication using USIM 2, the multi-USIM UE may be referred to as a USIM 2 UE. The multi-USIM UE may be either the USIM 1 UE or USIM 2 UE depending on which USIM among USIM 1 and USIM 2 is used.

In operation 1h-10, the USIM 1 UE 1h-02 may be in the RRC connected mode (RRC_CONNECTED) by establishing an RRC connection with the base station 1 1h-04. Dual connectivity is not established for the USIM 1 UE 1h-02. The USIM 2 UE 1h-03 may not establish an RRC connection with the base station 3 1h-06 and thus to be in an RRC idle mode (RRC_IDLE) or an RRC inactive mode (RRC_INACTIVE).

In operation 1h-15, the USIM 1 UE 1h-02 may transmit a UE capability information message (UECapabilityInformation) to the base station 1 1h-04. The UE capability information message may include information according to the above-described embodiment. Additionally, the UE capability information message may include an indicator that NE-DC is supported or an indicator that NR-DC is supported.

In operation 1h-20, the base station 1 1h-04 may transmit a predetermined RRC message including configuration information (SwitchingGapReportingConfig) indicating to report the switching gap information preferred/required for the USIM 1 UE 1h-02 to perform multi-USIM operation. Operation 1h-20 may be performed based on the above-described embodiment.

In operation 1h-25, the USIM 1 UE 1h-02 may transmit, to the base station 1h-04, a predetermined RRC message (e.g., UEAssistanceInformation) containing configuration information (SwitchingGapConfigPreference) for one or multiple preferred switching gap patterns. Operation 1h-25 may be performed based on the above-described embodiment.

In operation 1h-30, the base station 1 1h-04 may transmit, based on the SwitchingGapConfigPreference requested by the USIM 1 UE 1h-02 in response to the operation 1h-25, a predetermined RRC message (e.g., RRCReconfiguration or RRCResume) containing one or multiple pieces of switching gap configuration information (SwitchingGapConfig). Operation 1h-30 may be performed based on the above-described embodiment.

In operation 1h-35, the USIM 1 UE 1h-02 may transmit a predetermined RRC message (e.g., RRCReconfigurationComplete or RRCResumeComplete) to the base station 1 1h-04 in response to the predetermined RRC message, which is received in operation 1h-30. Operation 1h-35 may be performed based on the above-described embodiment.

In operation 1h-40, the USIM 1 UE 1h-02 may determine whether one or more switching gaps occur or not, through the SwitchingGapConfig which is received and applied in operation 1h-30, and the USIM 2 UE 1h-03 may perform a predetermined operation during the corresponding switching gap period. The predetermined operation and the determination as to whether the switching gap occurs may be performed based on the above-described embodiment.

In operation 1h-45, the base station 1 1h-04 may transmit a predetermined RRC message in order to establish dual connectivity (DC) (e.g., NR-DC or NE-DC) to the USIM 1 UE 1h-02. The predetermined RRC message may refer to an RRCReconfiguration or RRCResume message. The RRC message for configuring DC may be based on the above-described embodiment.

In the disclosure, when the base station 1 1h-04 transmits a predetermined RRC message to the USIM 1 UE 1h-02 in order to establish the DC, it is suggested to release the SwitchingGapConfig, which has been configured for the USIM 1 UE 1h-02 through the RRC message. As such, SwitchingGapReportingConfig may also be released. For reference, the procedure for configuring DC may be performed based on the above-described embodiment.

Additionally, in the disclosure, although the base station 1 1h-04 transmits a predetermined RRC message in order to establish DC to the USIM 1 UE 1h-02, when the SwitchingGapConfig having been configured for the USIM 1 UE 1h-02 is not released, it is also proposed that the USIM 1 UE 1h-02 autonomously releases the configured SwitchingGapConfig. For reference, SwitchingGapConfig may additionally refer to configuration information for the switching procedure for leaving RRC_CONNECTED state. As an example, the configuration information may refer to configuration information, such as a timer value for allowing the USIM 1 UE 1h-02 to perform autonomous state transition from RRC_CONNECTED state to RRC_IDLE state, a new prohibit timer, and the like.

In operation 1h-50, the USIM 1 UE 1h-02 may transmit a predetermined RRC message to the base station 1 1h-04 in response to the operation 1h-45. The predetermined RRC message may refer to an RRCReconfigurationComplete or RRCResumeComplete message.

In operation 1h-55, the USIM 1 UE 1h-02 may operate as DC. For example, DC may refer to NR-DC or NE-DC.

In operation 1h-60, the USIM 1 UE 1h-02 may transmit, to the base station 1 1h-04, a predetermined RRC message (e.g., UEAssistanceInformation) containing configuration information (SwitchingGapConfigPreference) for one or multiple preferred switching gap patterns. Operation 1h-60 may be performed based on the above-described embodiment. For reference, when the base station 1 1h-04 releases the SwitchingGapReportingConfig in connection with the USIM 1 UE 1h-02 in operation 1h-45, the above-described operation 1h-20 may be performed before operation 1h-60.

In operation 1h-65, the base station 1 1h-04 may transmit, in response to operation 1h-60, a predetermined RRC message (e.g., RRCReconfiguration) containing one or multiple pieces of switching gap configuration information (SwitchingGapConfig) based on the SwitchingGapConfigPreference requested by the USIM 1 UE 1h-02. Operation 1h-65 may be performed based on the above-described embodiment. In the disclosure, when the base station 1 1h-04 transmits a predetermined RRC message containing one or multiple pieces of switching gap configuration information (SwitchingGapConfig) to the USIM 1 UE 1h-02, it is proposed to release the DC having configured for the USIM 1 UE 1h-02 through the RRC message.

In operation 1h-70, the USIM 1 UE 1h-02 may apply the RRC message received in operation 1h-60 and transmit the RRCReconfigurationComplete message to the base station 1 1h-04.

In operation 1h-75, the USIM 1 UE 1h-02 is not configured with dual connectivity.

Figure 9:
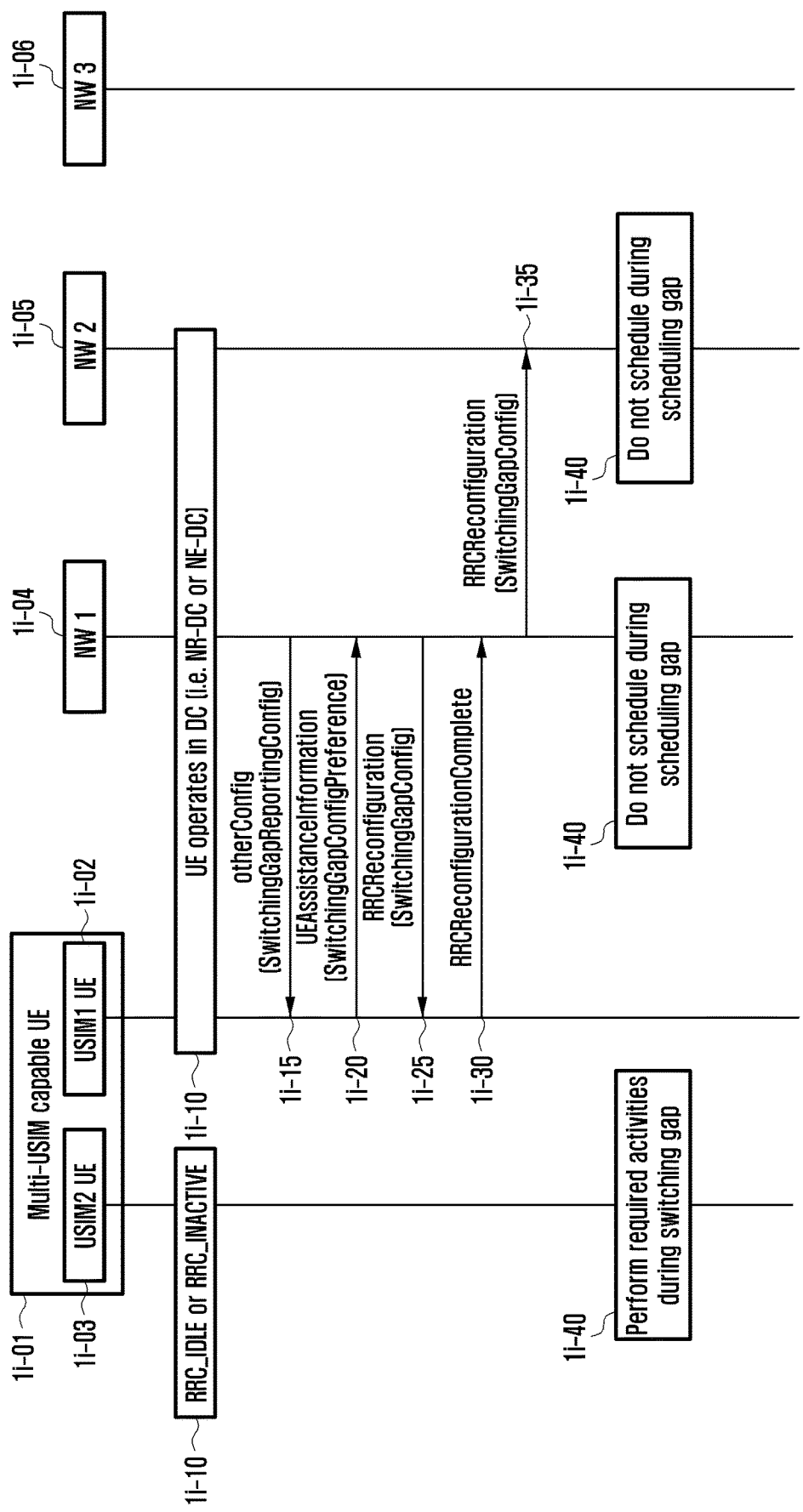
FIG. 9 illustrates an overall flow diagram in which a UE supporting multiple universal subscriber identity module (USIMs) (multi-USIM UE) operates as NE-DC or NR-DC according to an embodiment of the disclosure.

FIG. 9 illustrates an overall flow diagram in which a UE supporting multiple universal subscriber identity module (USIMs) (multi-USIM UE) operates as NE-DC or NR-DC according to an embodiment of the disclosure.

A multi-USIM UE 1i-01 according to an embodiment may refer to a terminal supporting two or more USIMs. In the disclosure, for convenience of description, a dual-USIM UE supporting two USIMs is considered. The dual-USIM UE has a characteristic of transmitting only to one or multiple base stations associated with one USIM at a given period of time. On the other hand, the dual-USIM UE may perform reception from a base station associated with one USIM at a given period of time or perform reception from a base station associated with each USIM at the same time.

Referring to FIG. 9, the multi-USIM UE 1i-01 may refer to a terminal in which one device supports multiple USIMs. The multi-USIM UE may refer to a USIM 1 UE 1i-02 when operating in USIM 1, and may refer to a USIM 2 UE 1i-03 when operating in USIM 2. The base station associated with each USIM may recognize the multi-USIM UE as one terminal per USIM UE level rather than recognizing the multi-USIM UE as one terminal. As an example, base station 1 1i-04 and base station 2 1i-05 may recognize the USIM 1 UE 1i-02 as one terminal, and base station 3 1i-06 may recognize the USIM 2 UE 1i-03 as one terminal.

Hereinafter, in the embodiments, for convenience of description, when a multi-USIM UE performs communication using USIM 1, the multi-USIM UE may be referred to as a USIM 1 UE, and when the multi-USIM UE performs communication using USIM 2, the multi-USIM UE may be referred to as a USIM 2 UE. The multi-USIM UE may be either the USIM 1 UE or USIM 2 UE depending on which USIM among USIM 1 and USIM 2 is used.

In operation 1i-10, the USIM 1 UE 1i-02 may be in the RRC connected mode (RRC_CONNECTED) by establishing an RRC connection with the base station 1 1i-04. In addition, the USIM 1 UE 1i-02 may be configured with dual connectivity, and thus perform data transmission or reception to or from the base station 1 1i-04 and the base station 2 1i-05. On the other hand, the USIM 2 UE 1i-03 may not establish an RRC connection with the base station 3 1i-06 and thus to be in an RRC idle mode (RRC_IDLE) or an RRC inactive mode (RRC_INACTIVE).

In operation 1i-15, the base station 1 1i-04 may transmit a predetermined RRC message including configuration information (SwitchingGapReportingConfig) indicating to report the switching gap information preferred/required for the USIM 1 UE 1i-02 to perform multi-USIM operation. Operation 1i-15 may be performed based on the above-described embodiment.

In operation 1i-20, the USIM 1 UE 1i-02 may transmit, to the base station 1i-04, a predetermined RRC message (e.g., UEAssistanceInformation) containing configuration information (SwitchingGapConfigPreference) for one or multiple preferred switching gap patterns. Operation 1i-20 may be performed based on the above-described embodiment.

In operation 1i-25, the base station 1 1i-04 may transmit, in response to the operation 1i-25, a predetermined RRC message (e.g., RRCReconfiguration or RRCResume) containing one or multiple pieces of switching gap configuration information (SwitchingGapConfig) based on the SwitchingGapConfigPreference requested by the USIM 1 UE 1i-02. Operation 1i-25 may be performed based on the above-described embodiment. In the disclosure, even if the USIM 1 UE 1i-02 operates in DC, the base station 1 1i-04 may transmit a predetermined RRC message (e.g., RRCReconfiguration or RRCResume) containing one or multiple pieces of switching gap configuration information (SwitchingGapConfig) to the USIM 1 UE 1i-02.

In operation 1i-30, the USIM 1 UE 1i-02 may transmit a predetermined RRC message (e.g., RRCReconfigurationComplete or RRCResumeComplete) to the base station 1 1i-04 in response to the predetermined RRC message, which is received in operation 1i-25. Operation 1i-30 may be performed based on the above-described embodiment.

In operation 1i-35, the base station 1 1i-04 may transmit, to the base station 2 1i-05, a predetermined inter-node message containing one or multiple pieces of switching gap configuration information (SwitchingGapConfig). The predetermined inter-node message may refer to CG-ConfigInfo.

Additionally, the message may contain pieces of information required in the above-described operation 1*f*-50.

In operation 1*i*-40, the USIM 1 UE 1*i*-02 may determine whether one or multiple switching gaps occur through the SwitchingGapConfig, which is received and applied in operations 1*i*-30, and the USIM 2 UE 1*i*-03 may perform a predetermined operation during the corresponding switching gap period. The predetermined operation and determination as to whether a switching gap occurs or not may be performed based on the above-described embodiment. In operation 1*i*-40, the base station 1 1*i*-04 and the base station 2 1*i*-05 may not transmit a signal to the USIM 1 UE 1*i*-02 or not perform scheduling during the switching gap period.

Figure 10:
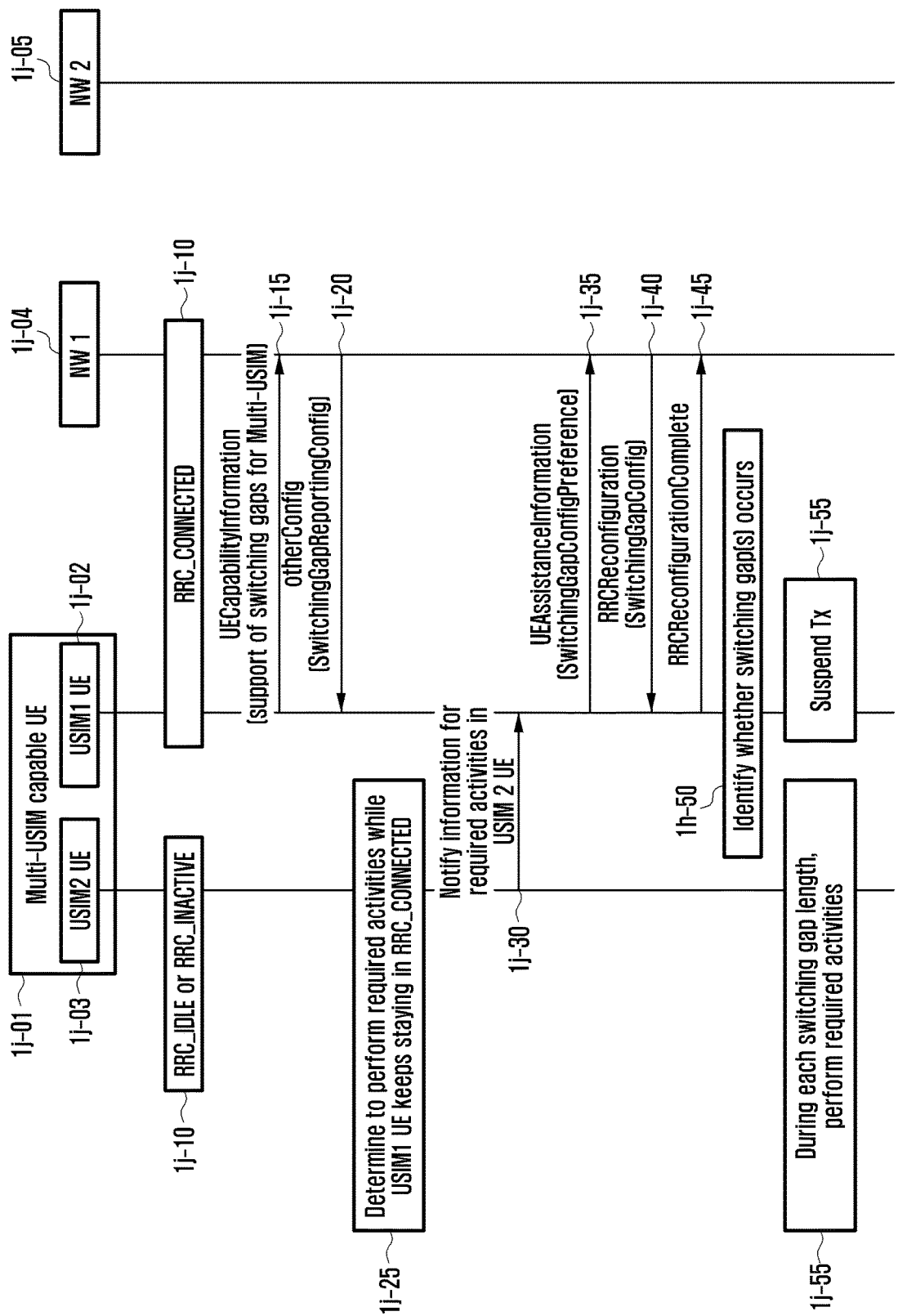
FIG. 10 illustrates an operation in which a UE supporting multiple universal subscriber identity module (USIMs) (multi-USIM UE) performs operations associated with other USIMs while maintaining an RRC connected mode (RRC_CONNECTED) with a base station associated with one USIM according to an embodiment of the disclosure.

FIG. 10 illustrates an operation in which a UE supporting multiple universal subscriber identity module (USIMs) (multi-USIM UE) performs operations associated with other USIMs while maintaining an RRC connected mode (RRC_CONNECTED) with a base station associated with one USIM according to an embodiment of the disclosure.

A multi-USIM UE 1*j*-01 according to an embodiment may refer to a terminal supporting two or more USIMs. In the disclosure, for convenience of description, a dual-USIM UE supporting two USIMs is considered. The dual-USIM UE has a characteristic of transmitting only to a base station associated with one USIM at a given period of time. On the other hand, the dual-USIM UE may perform reception from a base station associated with one USIM at a given period of time or perform reception from a base station associated with each USIM at the same time.

Referring to FIG. 10, the multi-USIM UE 1*j*-01 may refer to a terminal in which one device supports multiple USIMs. The multi-USIM UE may refer to a USIM 1 UE 1*j*-02 when operating in USIM 1, and may refer to a USIM 2 UE 1*j*-03 when operating in USIM 2. The base station associated with each USIM may recognize the multi-USIM UE as one terminal per USIM UE level rather than recognizing the multi-USIM UE as one terminal. As an example, base station 1 1*j*-04 may recognize the USIM 1 UE 1*j*-02 as one terminal, and base station 2 1*j*-05 may recognize the USIM 2 UE 1*j*-03 as one terminal. Hereinafter, in the embodiments, for convenience of description, when a multi-USIM UE performs communication using USIM 1, the multi-USIM UE may be referred to as a USIM 1 UE, and when the multi-USIM UE performs communication using USIM 2, the multi-USIM UE may be referred to as a USIM 2 UE. The multi-USIM UE may be either the USIM 1 UE or USIM 2 UE depending on which USIM among USIM 1 and USIM 2 is used.

In operation 1*j*-10, the USIM 1 UE 1*j*-02 may be in the RRC connected mode (RRC_CONNECTED) by establishing an RRC connection with the base station 1 1*j*-04. On the other hand, in operation 1*j*-10, the USIM 2 UE 1*j*-03 may not establish an RRC connection with the base station 2 1*j*-05 and thus to be in an RRC idle mode (RRC_IDLE) or an RRC inactive mode (RRC_INACTIVE).

In operation 1*j*-15, the USIM 1 UE 1*j*-02 may transmit a UE capability information message (UECapabilityInformation) to the base station 1 1*j*-04. The UE capability information message may include at least one of the following information.

An indicator or information element that supports Multi-USIM.

An indicator indicating that the USIM 1 UE 1*j*-02 supporting of a procedure in which the USIM 1 UE 1*j*-02 performs switching to the USIM 2 UE 1*j*-03 from the base station 1 1*j*-04 for leaving the RRC connected mode (support of switching procedure for leaving RRC_CONNECTED state). For example, when the USIM 2 UE 1*j*-03 establishes or resumes the RRC connection with the base station 2 1*j*-05 and thus transitions to the RRC connected mode, or when the USIM 2 UE 1*j*-03 needs to transmit a signal to base station 2 1*j*-05, it is referred to as a procedure in which the USIM 1 UE 1*j*-02 notifies the base station 1 1*j*-04 of desiring to leave the RRC connected mode or of transition to an RRC state (e.g., RRC idle mode or RRC inactive mode), and this may be referred to as a switching procedure without leaving RRC_CONNECTED state.

An indicator or information element indicating supporting of a procedure in which the USIM 1 UE 1*j*-02 performs switching to the USIM 2 UE 1*j*-03 while maintaining the RRC connected mode with the base station 1 1*j*-04 (support of switching procedure without leaving RRC_CONNECTED state). For example, a procedure in which the USIM 2 UE 1*j*-03 performs an operation related to the base station 2 1*j*-05 while the USIM 1 UE 1*j*-02 maintains the RRC connected mode with the base station 1 1*j*-04 may be referred to as a switching procedure without leaving RRC_CONNECTED state.

An indicator or information element indicating that the USIM 1 UE 1*j*-02 performs switching to the USIM 2 UE 1*j*-03 while maintaining the RRC connected mode with the base station 1 1*j*-04 so as to support switching gaps required to communicate with the base station 2 1*j*-05 (support of switching gaps for multi-USIM purpose).

The switching gap may refer to a switching gap per UE level. If the USIM 1 UE 1*j*-02 supports a switching gap per frequency range (FR) or per frequency, a separate indicator or information element indicating this may be included in the UE capability information message.

In operation 1*j*-20, the base station 1 1*j*-04 may transmit a predetermined RRC message including configuration information (SwitchingGapReportingConfig) indicating to report the switching gap information preferred/required for the USIM 1 UE 1*j*-02 to perform multi-USIM operation. The predetermined RRC message may refer to an RRCReconfiguration message, an RRCResume message, or a new RRC message. Additionally, the SwitchingGapReportingConfig may be contained in otherConfig. The SwitchingGapReportingConfig is configuration information related to a switching procedure without leaving RRC_CONNECTED state. The SwitchingGapReportingConfig may include at least one of the following.

An indicator or information element indicating whether the USIM 1 UE 1*j*-02 is allowed to transmit preferred switching gap configuration information while maintaining the RRC connected mode with the base station 1 1*j*-04 (e.g., SetupRelease)

New Prohibit Timer Value

In case that the base station 1 1*j*-04 configures or sets up the new prohibit timer value for the USIM 1 UE 1*j*-02, the USIM 1 UE 1*j*-02 may drive a new timer with the new prohibit timer value when a procedure for transmitting preferred switching gap configuration information to the base station 1 1*j*-04 is started, and may transmit a predetermined RRC message including the preferred switching gap configuration information to the base station 1 1*j*-04.

In operation 1*j*-25, the USIM 2 UE 1*j*-03 may determine whether to perform a predetermined operation in the RRC idle mode or the RRC inactive mode. The predetermined operation is an operation in which the USIM 2 UE 1j-03 is related to the base station 2 1j-05, and may refer to at least one of the following.

Operation 1: The USIM 2 UE 1j-03 may not perform an RRC connection establishment procedure or an RRC connection resume procedure with the base station 2 1j-05, but may perform receiving a signal transmitted by the base station 2 1j-05 or perform an internal operation of the USIM 2 UE based on the reception. For example, the following operation may be performed.

- The USIM 2 UE 1j-03 monitors a paging channel or short message associated with the base station 2 1j-05. The USIM 2 UE 1j-03 may monitor a paging occasion every discontinuous reception (DRX) cycle.
- The USIM 2 UE 1j-03 performs monitoring for reception of the system information change notification associated with the base station 2 1j-05. The USIM 2 UE 1j-03 may monitor a paging occasion every discontinuous reception (DRX) cycle.
- The USIM 2 UE 1j-03 performs cell selection or cell reselection evaluation procedure. As an example, the USIM 2 UE may perform measurement of a serving cell or a neighboring cell as part of a cell selection or cell reselection evaluation procedure.
- The USIM 2 UE 1j-03 performs a procedure of selecting a public land mobile network (PLMN)

Operation 2: The USIM 2 UE 1j-03 may not perform an RRC connection establishment procedure or an RRC connection resume procedure with the base station 2 1j-05, but may perform transmission to or reception from the base station 2 1j-05, for example, the following operation.

- The USIM 2 UE 1j-03 requests on-demand system information to acquire system information from the base station 2 1j-05 or in an on-demand method Operation 3: The USIM 2 UE 1j-03 in the RRC inactive mode performs an RRC connection resumption procedure with the base station 2 1j-05, but to fail to transition to the RRC connected mode. For example, the following operation may be performed.

- The USIM 2 UE 1j-03 may receive the RAN paging message transmitted by the base station 2 1j-05, and a UE identifier (I-RNTI) indicating the USIM 2 UE 1j-03 is included in the received RAN paging message. However, the USIM 1 UE 1j-02 may need to continuously perform data transmission or reception to or from the base station 1 1j-04. The USIM 2 UE 1j-03 may transmit, to the base station 2 1j-05, a RRCResumeRequest/1 message containing a busy indication indicating that it cannot respond to the RAN paging message received from the base station 2 1j-05. For reference, busy indication may be contained in resumeCause. In response thereto, the base station 2 1j-05 may transmit an RRCReject or RRCRelease message to the USIM 2 UE 1j-03.

Operation 4: The USIM 2 UE 1j-03 may transition to the RRC connected mode by performing a procedure for establishing or resuming an RRC connection with the base station 2 1j-05. For example, the following operation may be performed.

- The USIM 2 UE 1j-03 performs a registration update procedure or RAN notification area update procedure The above-described operation may be a periodic operation, an aperiodic operation, or may refer to a one-time operation.

In operation 1j-30, the USIM 2 UE 1j-03 may notify the USIM 1 UE 1j-02 of pieces of information required to perform the above-described operation in operation 1j-25 in the RRC idle mode or the RRC inactive mode. For reference, the operation 1j-30 may be implemented by the multi-USIM UE 1j-01.

In operation 1j-35, the USIM 1 UE 1j-02 may transmit, to the base station 1 1j-04, a predetermined RRC message containing configuration information (SwitchingGapConfigPreference) for one or multiple preferred switching gap patterns. The predetermined RRC message may refer to UEAssistanceInformation or a new RRC message. Specifically, when at least one of the following conditions is satisfied, the USIM 1 UE 1j-02 may transmit a predetermined RRC message including the SwitchingGapConfigPreference to the base station 1 1j-04.

- Condition 1: When a predetermined RRC message including SwitchingGapConfigPreference is not transmitted after SwitchingGapReportingConfig is configured in operation 1j-20
- Condition 2: When the currently preferred SwitchingGapConfigPreference is different from the most recently transmitted SwitchingGapConfigPreference
- Condition 3: When the currently preferred SwitchingGapConfigPreference is different from the currently configured SwitchingGapConfig
- Condition 4: When the currently preferred SwitchingGapConfigPreference is different from the most recently transmitted SwitchingGapConfigPreference and the above-mentioned new prohibit timer is not running in operation 1j-20
- Condition 5: If the currently preferred SwitchingGapConfigPreference is different from the currently configured SwitchingGapConfig, and the new prohibit timer is not running in operation 1j-20

For reference, in operation 1j-35, the USIM 1 UE 1j-02 may start (or restart) a new timer with the new prohibit timer value configured in operation 1j-20, and may transmit a predetermined RRC message including SwitchingGapConfigPreference to the base station 1 1j-04. The SwitchingGapConfigPreference may refer to configuration information, which is different from the measurement configuration information (MeasConfig) of the above-described embodiment. Specifically, one or multiple SwitchingGapConfigPreferences according to an embodiment may have a difference from MeasGapConfig of the above-described embodiment as follows.

SwitchingGapConfigPreference is switching gap configuration information which is requested by the USIM 1 UE 1j-02 through transmission to the base station 1 1j-04 so that the USIM 2 UE may perform the predetermined operation described above in operation 1j-30.

SwitchingGapConfigPreference may include one or multiple preferred switching gap patterns depending on an operation, which is required in operation 1j-25. Multiple switching gap offset values may be included during one long periodicity (switching gap repetition periodicity) to indicate multiple preferred switching gap patterns, and at least one of a switching gap length, switching gap timing advance, or refServCellIndicator (PCell, PSCell, or Serving cell), which are mapped to each switching gap offset, and an indicator indicating whether a periodicity occurs may be included therein. Alternatively, switching gap repetition periodicity, switching gap offset, switching gap length, switching gap timing advance, and refServCellIndicator (PCell or PSCell or Serving cell) for each switching gap pattern may be included therein. Alternatively, a specific gap pattern among multiple switching gap patterns may include an indicator indicating occurrence in one shot not periodic occurrence, or may not include a switching gap repetition periodicity value.

Alternatively, one or multiple gap patterns are pre-fixed and thus the gap pattern index value may be included in the SwitchingGapConfigPreference. As an example, gap pattern 1 may be mapped to a specific combination of switching gap repetition periodicity, switching gap offset, switching gap length, switching gap timing advance, and refServCellIndicator.

The units of switching gap repetition periodicity, switching gap length, and switching gap timing advance may refer to one of the units representing time. The units may be expressed in "ms", in units of slots, or in units of subframes. The switching gap offset may be indicated by one of 0 to the value obtained by (switching gap repetition periodicity−1).

SwitchingGapConfigPreference may include one or multiple switching gap patterns for each FR or for each UE, as in MeasGapConfig of the above-described embodiment.

SwitchingGapConfigPreference may be applied for each band, as in NeedForGapInfoNR of the above-described embodiment, but is different in that one or multiple switching gap patterns may be included for each band.

In operation 1j-40, the base station 1 1j-04 may transmit, in response to operation 1j-35, a predetermined RRC message containing one or multiple pieces of switching gap configuration information (SwitchingGapConfig) based on the SwitchingGapConfigPreference requested by the USIM 1 UE 1j-02. The predetermined RRC message may refer to RRCReconfiguration, RRCResume, or a new RRC message. Specifically, the base station 1 may include, in SwitchingGapConfig, permissible (or configurable) information among the received SwitchingGapConfigPreferences in operation 1j-40, or may change (delta) some information and include the same in SwitchingGapConfig.

In operation 1j-45, the USIM 1 UE 1j-02 may transmit a predetermined RRC message to the base station 1 1j-04 in response to the predetermined RRC message received in operation 1j-40. The predetermined RRC message may refer to RRCReconfigurationComplete, RRCResumeComplete, or a new RRC message.

In operation 1j-50, the USIM 1 UE 1j-02 may determine whether one or multiple switching gaps occur through the SwitchingGapConfig received and applied in operation 1j-40. For example, If SwitchingGapConfig is set to Setup:
  off SwitchingGapConfig has already been set up, the USIM 1 UE may release the corresponding SwitchingGapConfig;
  The USIM 1 UE may set up one or multiple switching gap patterns indicated by the SwitchingGapConfig received in operation 1j-40. Specifically, the first subframe and SFN each having a switching gap occurring therein need to satisfy condition 1 below (SFN may be based on PCell or a cell indicated by refServCellIndicator).

<Condition 1>
SFN mod T=FLOOR(switching gap offset/10);
subframe=switching gap offset mod 10;
with T=switching gap repetition periodicity/10 as defined in TS 38.133;
  The switching gap timing advance may be applied to a gap generated by satisfying the above conditions. The UE may apply the timing advance, which is indicated by the switching gap timing advance, to the gap timing point that occurs when the above condition is satisfied. The UE may start the measurement earlier by the switching gap timing advance than the gap subframe generation time point.

The constant value "10" may be fixed to another constant value, or the base station 1 1j-04 may configure the constant value as a specific value in operation 1j-40, or the constant value may be configured to be a specific value requested by the USIM 1 UE 1j-02 in operation 1j-35.
  The USIM 2 UE 1j-03 may perform a predetermined operation by the switching length from the generation of the gap subframe.
  One or multiple gap patterns, having been released in SwitchingGapConfig, may be released;
  When a switching gap is generated in operation 1j-50, the USIM 2 UE 1j-03 may perform at least one of the above-described operations, which are performed in operation 1j-25, during the switching gap length from a time point at which the switching gap is generated, in operation 1j-55. The USIM 1 UE 1j-02 maintains the RRC connected mode with the base station 1 1j-04. In addition, the USIM 1 UE 1j-02 does not transmit data/signals to the base station 1 1j-04 during the switching gap length from the time point at which the switching gap occurs.

Figure 11:
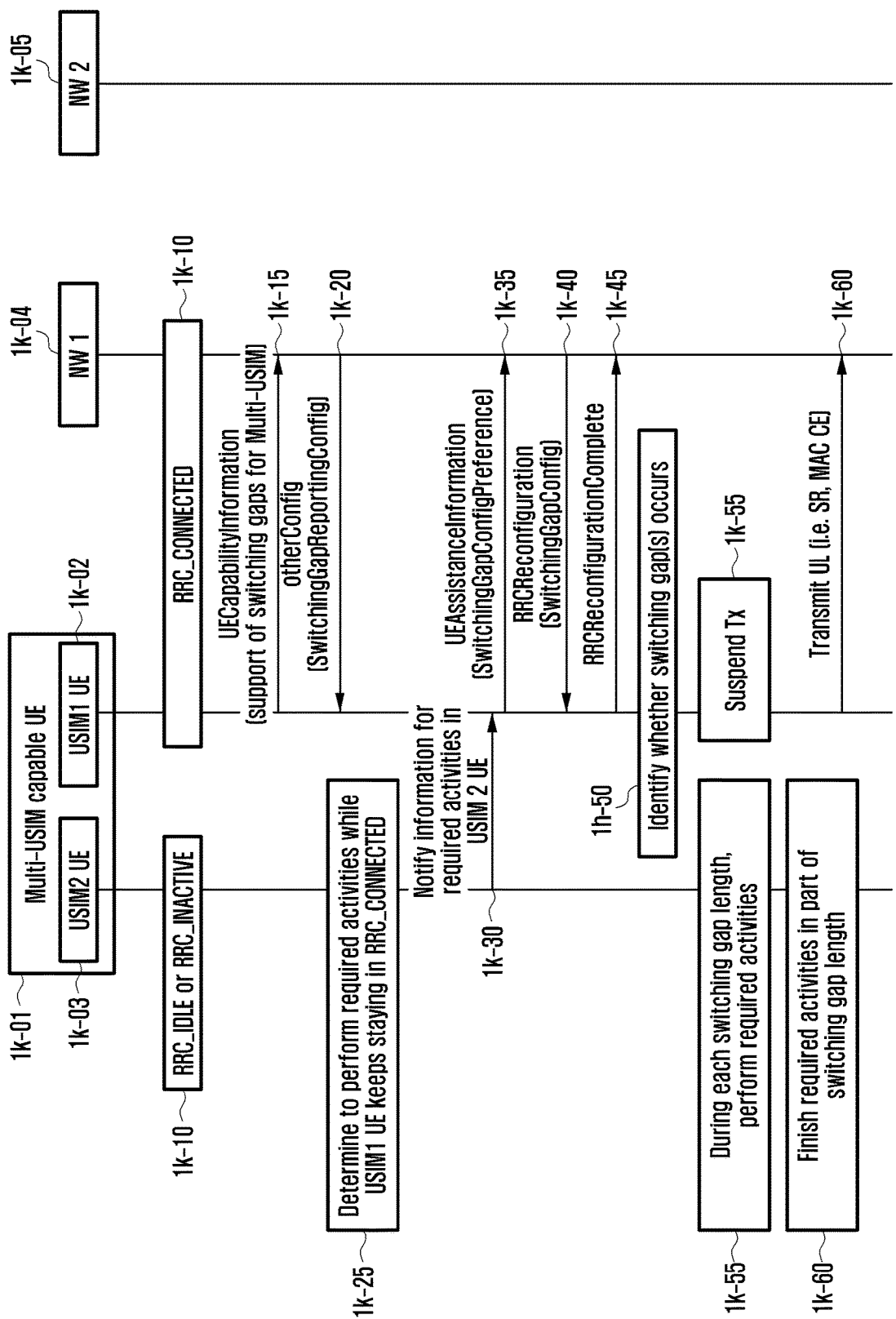
FIG. 11 illustrates an operation in which a UE supporting multiple universal subscriber identity module (USIMs) (multi-USIM UE) performs operations associated with other USIMs while maintaining an RRC connected mode (RRC_CONNECTED) with a base station associated with one USIM according to an embodiment of the disclosure.

FIG. 11 illustrates an operation in which a UE supporting multiple universal subscriber identity module (USIMs) (multi-USIM UE) performs operations associated with other USIMs while maintaining an RRC connected mode (RRC_CONNECTED) with a base station associated with one USIM according to an embodiment of the disclosure.

A multi-USIM UE 1k-01 according to an embodiment may refer to a terminal supporting two or more USIMs. In the disclosure, for convenience of description, a dual-USIM UE supporting two USIMs is considered. The dual-USIM UE has a characteristic of transmitting only to a base station associated with one USIM at a given period of time. On the other hand, the dual-USIM UE may perform reception from a base station associated with one USIM at a given period of time or perform reception from a base station associated with each USIM at the same time.

Referring to FIG. 11, the multi-USIM UE 1k-01 may refer to a terminal in which one device supports multiple USIMs. The multi-USIM UE may refer to a USIM 1 UE 1k-02 when operating in USIM 1, and may refer to a USIM 2 UE 1k-03 when operating in USIM 2. The base station associated with each USIM may recognize the multi-USIM UE as one terminal per USIM UE level rather than recognizing the multi-USIM UE as one terminal. As an example, base station 1 1k-04 may recognize the USIM 1 UE 1k-02 as one terminal, and base station 2 1k-05 may recognize the USIM 2 UE 1k-03 as one terminal.

Hereinafter, in the embodiments, for convenience of description, when a multi-USIM UE performs communication using USIM 1, the multi-USIM UE may be referred to as a USIM 1 UE, and when the multi-USIM UE performs communication using USIM 2, the multi-USIM UE may be referred to as a USIM 2 UE. The multi-USIM UE may be either the USIM 1 UE or USIM 2 UE depending on which USIM among USIM 1 and USIM 2 is used.

In operation 1k-10, the USIM 1 UE 1k-02 may be in the RRC connected mode (RRC_CONNECTED) by establishing an RRC connection with the base station 1 1k-04. On the other hand, in operation 1k-10, the USIM 2 UE 1k-03 may not establish an RRC connection with the base station 2 1k-05 and thus to be in an RRC idle mode (RRC_IDLE) or an RRC inactive mode (RRC_INACTIVE).

In operation 1k-15, the USIM 1 UE 1k-02 may transmit a UE capability information message (UECapabilityInformation) to the base station 1 1k-04. The UE capability information message may include at least one of the following pieces of information.

An indicator or information element indicating supporting of the multi-USIM

An indicator or information element indicating supporting of a procedure in which the USIM 1 UE 1k-02 performs switching to the USIM 2 UE 1k-03 from the base station 1 1k-04 for leaving the RRC connected mode (support of switching procedure for leaving RRC_CONNECTED state). For example, when the USIM 2 UE 1k-03 establishes or resumes the RRC connection with the base station 2 1k-05 and thus transitions to the RRC connected mode, or when the USIM 2 UE 1k-03 needs to transmit a signal to base station 2 1k-05, it is referred to as a procedure in which the USIM 1 UE 1k-02 notifies the base station 1 1k-04 of desiring to leave the RRC connected mode or of transition to an RRC state (e.g., RRC idle mode or RRC inactive mode), and this may be referred to as a switching procedure without leaving RRC_CONNECTED state.

An indicator or information element indicating supporting of a procedure in which the USIM 1 UE 1k-02 performs switching to the USIM 2 UE 1k-03 while maintaining the RRC connected mode with the base station 1 1k-04 (support of switching procedure without leaving RRC_CONNECTED state). For example, a procedure in which the USIM 2 UE 1k-03 performs an operation related to the base station 2 1k-05 while the USIM 1 UE 1k-02 maintains the RRC connected mode with the base station 1 1k-04 may be referred to as a switching procedure without leaving RRC_CONNECTED state.

An indicator or information element indicating that the USIM 1 UE 1k-02 performs switching to the USIM 2 UE 1k-03 while maintaining the RRC connected mode with the base station 1 1k-04 so as to support switching gaps required to communicate with the base station 2 1k-05 (support of switching gaps for multi-USIM purpose).

The switching gap may refer to a switching gap per UE level. If the USIM 1 UE 1k-02 supports a switching gap per frequency range (FR) or per frequency, a separate indicator or information element indicating this may be included in the UE capability information message.

In operation 1k-20, the base station 1 1k-04 may transmit a predetermined RRC message including configuration information (SwitchingGapReportingConfig) indicating to report the switching gap information preferred/required for the USIM 1 UE 1k-02 to perform multi-USIM operation. The predetermined RRC message may refer to an RRCReconfiguration message, an RRCResume message, or a new RRC message. Additionally, the SwitchingGapReportingConfig may be contained in otherConfig. The SwitchingGapReportingConfig is configuration information related to a switching procedure without leaving RRC_CONNECTED state. The SwitchingGapReportingConfig may include at least one of the following.

An indicator or information element indicating whether the USIM 1 UE 1k-02 is allowed to transmit preferred switching gap configuration information while maintaining the RRC connected mode with the base station 1 1k-04 (e.g., SetupRelease)

New Prohibit Timer Value

In case that the base station 1 1k-04 configures or sets up the new prohibit timer value for the USIM 1 UE 1k-02, the USIM 1 UE 1k-02 may drive a new timer with the new prohibit timer value when a procedure for transmitting preferred switching gap configuration information to the base station 1 1k-04 is started, and may transmit a predetermined RRC message including the preferred switching gap configuration information to the base station 1 1k-04.

Indicator Indicating Permission of Uplink (UL) Signal Transmission

When the indicator is configured, the USIM 1 UE 1k-02 may transmit a signal to the base station 1 1k-04 when a predetermined condition is satisfied, and accordingly, may monitor a signal transmitted by the base station 1 1k-04. The predetermined condition may refer to a case in which, if the USIM 2 UE 1k-03 has finished the operation, which is related to the base station 2 1k-05, earlier than the configured switching gap length, an event in which the USIM 1 UE 1k-02 needs to transmit a signal to the base station 1 1k-04 occurs in the remaining part of switching gap duration (if USIM 2 UE has finished its activity in part of switching gap duration, in the remaining part of switching gap duration any UL event is triggered in USIM 1 UE)._Alternatively, the predetermined condition may refer to a case in which, if the USIM 2 UE 1k-03 has finished the operation, which is related to the base station 2 1k-05, earlier than the configured switching gap duration, a specific event in which the USIM 1 UE 1k-02 needs to transmit a signal to the base station 1 1k-04 occurs in the remaining part of switching gap duration. The specific event may refer to a case in which a scheduling request or random access is triggered.

Indicator Indicating Permission of Autonomous Switching Gap Cancellation when the indicator is configured, the USIM 1 UE 1k-02 may transmit a signal to the base station 1 1k-04 when a predetermined condition is satisfied, cancel the remaining switching gap duration, and monitor the signal transmitted by the base station 1 1k-04. The predetermined condition may refer to a case in which, if the USIM 2 UE 1k-03 has finished the operation, which is related to the base station 2 1k-05, earlier than the configured switching gap duration, all event or a specific event in which the USIM 1 UE 1k-02 needs to transmit a signal to the base station 1 1k-04 occurs in the remaining part of switching gap duration (e.g., SR or random access is triggered). For reference, if the corresponding switching gap occurs periodically, the above conditions should be checked each time.

Switching Gap Duration Threshold

The USIM 1 UE 1k-02 may transmit a signal to base station 1 1k-04 when a predetermined condition is satisfied, and accordingly, may monitor a signal transmitted by the base station 1 1k-04. The predetermined condition may refer to a case in which, if the configured switching gap length is greater than the switching gap duration threshold, or is equal to or greater than the switching gap duration threshold, and the USIM 2 UE 1k-03 has finished the operation, which is related to the base station 2 1k-05, earlier than the configured switching gap length, an event (any UL event) or specific event (e.g., SR or RA is triggered) in which the USIM 1 UE 1k-02 needs to transmit a signal to the base station 1 1k-04 occurs in the remaining part of switching gap duration. Alternatively, the predetermined condition may refer to a case in which, if the USIM 2 UE 1k-03 has finished the operation, which is related to the base station 2 1k-05, earlier than the configured switching gap length, an event (any UL event) or specific event (e.g., SR or RA is triggered) in which the USIM 1 UE 1k-02 needs to transmit a signal to the base station 1 1k-04 occurs in the remaining part of switching gap duration, which is greater than the switching gap duration threshold, or is equal to or greater than the switching gap duration threshold.

The USIM 1 UE 1k-02 may transmit the MAC CE to the base station 1 1k-04 when a predetermined condition is satisfied. The predetermined condition may refer to a case in which, if the configured switching gap length is greater than the switching gap duration threshold, or is equal to or greater than the switching gap duration threshold, and the USIM 2 UE 1k-03 has finished the operation, which is related to the base station 2 1k-05, earlier than the configured switching gap length, an event (any UL event) or a specific event (SR or RA is triggered) in which the USIM 1 UE 1k-02 needs to transmit a signal to the base station 1 1k-04 occurs in the remaining part of switching gap duration. Alternatively, the predetermined condition may refer to a case in which, if the USIM 2 UE 1k-03 has finished the operation, which is related to the base station 2 1k-05, earlier than the configured switching gap length, an event (any UL event) or a specific event (SR or RA is triggered) in which the USIM 1 UE 1k-02 needs to transmit a signal to the base station 1 1k-04 occurs in the remaining part of switching gap duration, which is greater than the switching gap duration threshold, or is equal to or greater than the switching gap duration threshold.

In operation 1k-25, the USIM 2 UE 1k-03 may determine whether to perform a predetermined operation in the RRC idle mode or the RRC inactive mode. The predetermined operation is an operation in which the USIM 2 UE 1k-03 is related to the base station 2 1k-05, and may refer to at least one of the following.

Operation 1: The USIM 2 UE 1k-03 may not perform an RRC connection establishment procedure or an RRC connection resume procedure with the base station 2 1k-05, but may perform receiving a signal transmitted by the base station 2 1k-05 or perform an internal operation of the USIM 2 UE based on the reception. For example, the following operation may be performed.

The USIM 2 UE 1k-03 monitors a paging channel or short message associated with the base station 2 1k-05. The USIM 2 UE 1k-03 may monitor a paging occasion every discontinuous reception (DRX) cycle.

The USIM 2 UE 1k-03 performs monitoring for reception of the system information change notification associated with the base station 2 1k-05. The USIM 2 UE 1k-03 may monitor a paging occasion every discontinuous reception (DRX) cycle.

The USIM 2 UE 1k-03 performs cell selection or cell reselection evaluation procedure. As an example, the USIM 2 UE may perform measurement of a serving cell or a neighboring cell as part of a cell selection or cell reselection evaluation procedure.

The USIM 2 UE 1k-03 performs a procedure of selecting a public land mobile network (PLMN)

Operation 2: The USIM 2 UE 1k-03 may not perform an RRC connection establishment procedure or an RRC connection resume procedure with the base station 2 1k-05, but may perform transmission to or reception from the base station 2 1k-05, for example, the following operation.

The USIM 2 UE 1k-03 requests on-demand system information to acquire system information from the base station 2 1k-05 or in an on-demand method Operation 3: The USIM 2 UE 1k-03 in the RRC inactive mode performs an RRC connection resumption procedure with the base station 2 1k-05, but fails to transition to the RRC connected mode. For example, the following operation may be performed.

The USIM 2 UE 1k-03 may receive the RAN paging message transmitted by the base station 2 1k-05, and a UE identifier (I-RNTI) indicating the USIM 2 UE 1k-03 is included in the received RAN paging message. However, the USIM 1 UE 1k-02 may need to continuously perform data transmission or reception to or from the base station 1 1k-04. The USIM 2 UE 1k-03 may transmit, to the base station 2 1k-05, a RRCResumeRequest/1 message containing a busy indication indicating that it cannot respond to the RAN paging message received from the base station 2 1k-05. For reference, the busy indication may be contained in resumeCause. In response thereto, the base station 2 1k-05 may transmit an RRCReject or RRCRelease message to the USIM 2 UE 1k-03.

Operation 4: The USIM 2 UE 1k-03 may transition to the RRC connected mode by performing a procedure for establishing or resuming an RRC connection with the base station 2 1k-05. For example, the following operation may be performed.

The USIM 2 UE 1k-03 performs a registration update procedure or RAN notification area update procedure The above-described operation may be a periodic operation, an aperiodic operation, or may refer to a one-time operation.

In operation 1k-30, the USIM 2 UE 1k-03 may notify the USIM 1 UE 1k-02 of pieces of information required to perform the above-described operation in operation 1k-25 in the RRC idle mode or the RRC inactive mode. For reference, the operation 1k-30 may be implemented by the multi-USIM UE 1k-01.

In operation 1k-35, the USIM 1 UE 1k-02 may transmit, to the base station 1 1k-04, a predetermined RRC message containing configuration information (SwitchingGapConfigPreference) for one or multiple preferred switching gap patterns. The predetermined RRC message may refer to UEAssistanceInformation or a new RRC message. Specifically, when at least one of the following conditions is satisfied, the USIM 1 UE 1k-02 may transmit a predetermined RRC message including the SwitchingGapConfigPreference to the base station 1 1k-04.

Condition 1: When a predetermined RRC message including SwitchingGapConfigPreference is not transmitted after SwitchingGapReportingConfig is configured in operation 1k-20

Condition 2: When the currently preferred SwitchingGapConfigPreference is different from the most recently transmitted SwitchingGapConfigPreference Condition 3: When the currently preferred SwitchingGapConfigPreference is different from the currently configured SwitchingGapConfig Condition 4: When the currently preferred SwitchingGapConfigPreference is different from the most recently transmitted SwitchingGapConfigPreference and the above-mentioned new prohibit timer is not running in operation 1k-20

Condition 5: When the currently preferred SwitchingGapConfigPreference is different from the currently configured SwitchingGapConfig, and the new prohibit timer is not running in operation 1k-20

For reference, in operation 1k-35, the USIM 1 UE 1k-02 may start (or restart) a new timer with the new prohibit timer value configured in operation 1k-20, and may transmit a predetermined RRC message including SwitchingGapConfigPreference to the base station 1 1k-04. The SwitchingGapConfigPreference may refer to configuration information, which is different from the measurement configuration information (MeasConfig) of the above-described embodiment. Specifically, one or multiple SwitchingGapConfigPreferences according to an embodiment may have a difference from MeasGapConfig of the above-described embodiment as follows.

SwitchingGapConfigPreference is switching gap configuration information which is requested by the USIM 1 UE 1k-02 through transmission to the base station 1 1k-04 so that the USIM 2 UE may perform the predetermined operation described above in operation 1k-30.

SwitchingGapConfigPreference may include one or multiple preferred switching gap patterns depending on the operation, which is required in operations 1k-25. Multiple switching gap offset values may be included during one long periodicity (switching gap repetition periodicity) to indicate multiple preferred switching gap patterns, and at least one of a switching gap length, switching gap timing advance, or refServCellIndicator (PCell, PSCell, or Serving cell), which are mapped to each switching gap offset, and an indicator indicating whether a periodicity occurs may be included therein. Alternatively, switching gap repetition periodicity, switching gap offset, switching gap length, switching gap timing advance, and refServCellIndicator (PCell or PSCell or Serving cell) for each switching gap pattern may be included therein. Alternatively, a specific gap pattern among multiple switching gap patterns may include an indicator indicating occurrence in one shot not periodic occurrence, or may not include a switching gap repetition periodicity value. Alternatively, one or multiple gap patterns are pre-fixed and thus the gap pattern index value may be included in the SwitchingGapConfigPreference. As an example, gap pattern 1 may be mapped to a specific combination of switching gap repetition periodicity, switching gap offset, switching gap length, switching gap timing advance, and refServCellIndicator.

The units of switching gap repetition periodicity, switching gap length, and switching gap timing advance may refer to one of the units representing time. The units may be expressed in "ms", in units of slots, or in units of subframes. The switching gap offset may be indicated by one of 0 to the value obtained by (switching gap repetition periodicity−1).

SwitchingGapConfigPreference may include one or multiple switching gap patterns for each FR or for each UE, as in MeasGapConfig of the above-described embodiment.

SwitchingGapConfigPreference may be applied for each band, as in NeedForGapInfoNR of the above-described embodiment, but is different in that one or multiple switching gap patterns may be included for each band.

In operation 1k-40, the base station 1 1k-04 may transmit, in response to operation 1k-35, a predetermined RRC message containing one or multiple pieces of switching gap configuration information (SwitchingGapConfig) based on the SwitchingGapConfigPreference requested by the USIM 1 UE 1k-02. The predetermined RRC message may refer to RRCReconfiguration, RRCResume, or a new RRC message. Specifically, the base station 1 may include, in SwitchingGapConfig, permissible (or configurable) information among the received SwitchingGapConfigPreferences in operation 1k-40, or may change (delta) some information and include the same in SwitchingGapConfig. In operation 1k-40, the base station 1 1k-04 may include, in SwitchingGapConfig, at least one of an indicator indicating permission of uplink (UL) signal transmission, an indicator indicating permission of autonomous switching gap cancellation, and a switching gap duration threshold, which are described above in operation 1j-20. Alternatively, in operation 1k-40, the base station 1 1k-04 may be configured such that, with regard to a specific logical channel (CHL), the USIM 2 UE 1k-03 has finished the operation, which is related to the base station 2 1k-05, earlier than the configured switching gap length and in the remaining part of switching gap duration, the USIM 1 UE 1k-02 may transmit a signal to the base station 1 1k-04. As an example, the base station 1 1k-04 may allow the USIM 1 UE to transmit a signal to base station 1 1k-04 via LogicalChannelConfig. The base station 1 1k-04 may be configured such that the USIM 1 UE 1k-02 transmits UL to the base station 1 1k-04 in a specific LCH through allowed-ServingCells, and initiates a scheduling request or random access procedure.

In operation 1k-45, the USIM 1 UE 1k-02 may transmit a predetermined RRC message to the base station 1 1k-04 in response to the predetermined RRC message received in operation 1k-40. The predetermined RRC message may refer to RRCReconfigurationComplete, RRCResumeComplete, or a new RRC message.

In operation 1k-50, the USIM 1 UE 1k-02 may determine whether one or multiple switching gaps occur through the SwitchingGapConfig received and applied in operation 1k-40. For example, If SwitchingGapConfig is set to Setup:
  off SwitchingGapConfig has already been set up, the USIM 1 UE may release the corresponding SwitchingGapConfig;
  The USIM 1 UE may set up one or multiple switching gap patterns indicated by the SwitchingGapConfig received in operation 1k-40. Specifically, the first subframe and SFN each having a switching gap occurring therein need to satisfy condition 1 below (SFN may be based on PCell or a cell indicated by refServCellIndicator).

<Condition 1>
  SFN mod T=FLOOR(switching gap offset/10);
  subframe=switching gap offset mod 10;
  with T=switching gap repetition periodicity/10 as defined in TS 38.133;
    The switching gap timing advance may be applied to a gap generated by satisfying the above conditions. The UE may apply the timing advance, which is indicated by the switching gap timing advance, to a gap timing point occurring when the above condition is satisfied. The UE may start the measurement earlier by the switching gap timing advance than the gap subframe generation time point.
    The constant value "10" may be fixed to another constant value, or the base station 1 1k-04 may configure the constant value as a specific value in operation 1k-40, or the constant value may be configured to be a specific value requested by the USIM 1 UE 1k-02 in operation 1k-35.
    The USIM 2 UE 1k-03 may perform a predetermined operation by the switching length from the generation of the gap subframe.
  One or multiple gap patterns, having been released in SwitchingGapConfig, may be released;

When a switching gap is generated in operation 1k-50, the USIM 2 UE 1k-03 may perform at least one of the above-described operations, which are performed in operation 1k-25, during the switching gap length from a time point at which the switching gap is generated, in operation 1k-55. When the USIM 2 UE 1k-03 performs a predetermined operation, the USIM 1 UE 1k-02 may not be configured to transmit a signal to the base station 1 1k-04 (indicated by reference numeral 1k-55).

In operation 1k-60, the USIM 2 UE 1k-03 may be configured to finish the operation 1k-25 earlier than the configured switching gap length. For example, although the USIM 2 UE determines to perform the cell reselection process for 2 seconds, the USIM 2 UE has finished the cell reselection process in 0.5 seconds, and thus the USIM 2 UE may not perform a separate operation for 1.5 seconds.

In operation 1k-60, the USIM 1 UE 1k-02 may be configured to transmit a signal to the base station 1 1k-04 when at least one of the following conditions is satisfied.

Condition 1: When a UL event is triggered in the remaining switching gap length

Condition 2: When a specific UL event is triggered in the remaining switching gap length. As an example, when a scheduling request or random access is triggered Condition 3: When the base station 1 1k-04 is configured such that the USIM 1 UE 1k-02 transmits UL to base station 1 1k-04 in the remaining switching gap length in a specific LCH, and a (specific) UL event is triggered on the corresponding LCH Condition 4: When an indicator indicating permission of UL signal transmission or an indicator indicating permission of autonomous switching gap cancellation has been configured and condition 1 or 2 is satisfied Condition 5: When the switching gap duration threshold has been configured and the remaining switching gap length is greater than the switching gap duration threshold, or is equal to or greater than the switching gap duration threshold, and condition 1 or condition 2 is satisfied Condition 6: When the switching gap length is greater than the switching gap duration threshold, or is equal to or greater than the switching gap duration threshold, and condition 1 or condition 2 is satisfied.

Alternatively, the USIM 1 UE 1k-02 may transmit the MAC CE to the base station 1 1k-04 when at least one of the following conditions is satisfied.

Condition 7: When base station 1 1k-04 is configured such that the USIM 1 UE 1k-02 transmits the MAC CE to the base station 1 1k-04 in the remaining switching gap length in a specific LCH Condition 8: When the switching gap duration threshold has been configured and the remaining switching gap length is greater than the switching gap duration threshold, or is equal to or greater than the switching gap duration threshold Condition 9: When the switching gap length is greater than the switching gap duration threshold, or is equal to or greater than the switching gap duration threshold FIG. 12 is a block diagram illustrating an internal structure of a UE according to an embodiment of the disclosure.

Figure 12:
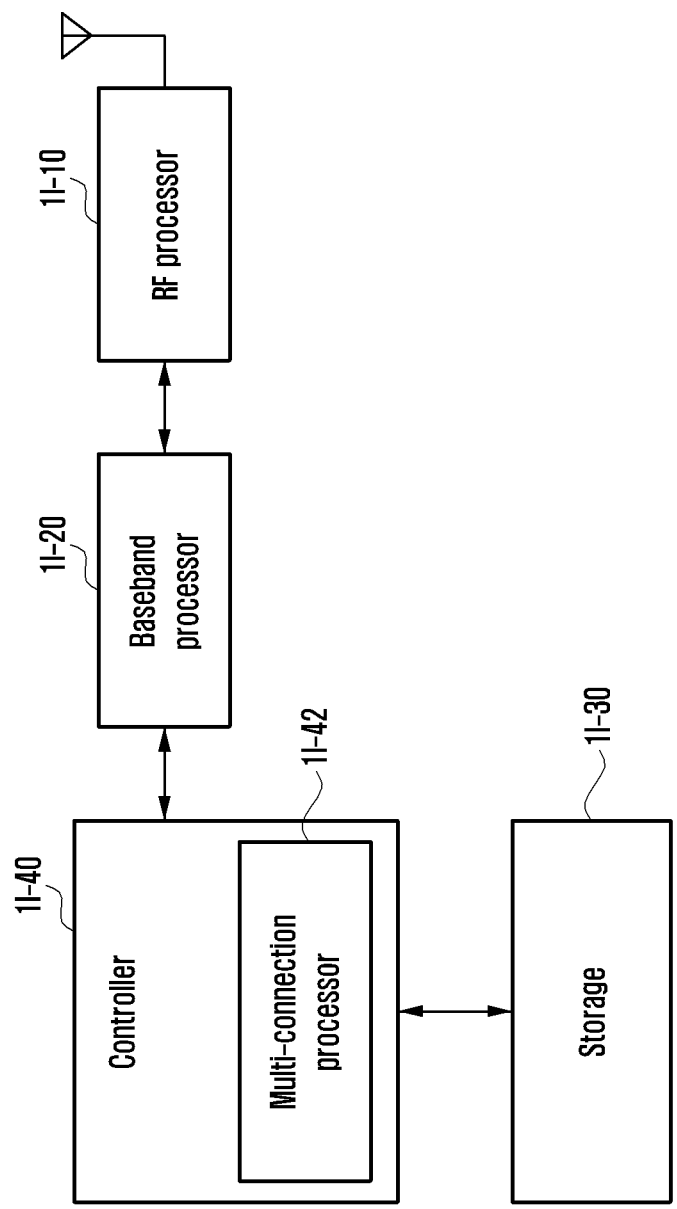
FIG. 12 is a block diagram illustrating an internal structure of a UE according to an embodiment of the disclosure.

Referring to FIG. 12, the UE may include a radio frequency (RF) processor 1l-10, a baseband processor 1l-20, a storage 1l-30, a controller 1l-40 (for example, at least one processor), and a multi-connection processor 1l-42.

In an embodiment, the RF processor 1l-10 may perform a function for transmitting and receiving a signal through a wireless channel such as band conversion, amplification, and the like of a signal. The RF processor 1l-10 may up-convert a baseband signal provided from the baseband processor 1l-20 into an RF band signal and may transmit the RF band signal through an antenna, and may down-convert the RF band signal received through the antenna into a baseband signal. The RF processor 1l-10 may include a transmission filter, a reception filter, an amplifier, a mixer, an oscillator, a digital to analog convertor (DAC), an analog to digital convertor (ADC), and the like. In the drawing, only one antenna is shown, but the UE may be provided with multiple antennas. In addition, the RF processor 1l-10 may include multiple RF chains. In addition, the RF processor 1l-10 may perform beamforming. For the beamforming, the RF processor 1l-10 may adjust the phase and magnitude of each of signals transmitted and received through multiple antennas or antenna elements. In addition, the RF processor may perform MIMO and may receive multiple layers when performing the MIMO operation.

In another embodiment, the baseband processor 1l-20 may perform a conversion function between a baseband signal and a bit string according to a physical layer standard of the system. For example, during data transmission, the baseband processor 1l-20 generates complex symbols by encoding and modulating a transmission bit string. In addition, during data reception, the baseband processor 1l-20 may reconstruct the received bit string by demodulating and decoding a baseband signal provided from the RF processor 1l-10. For example, according to an orthogonal frequency division multiplexing (OFDM) scheme, during data transmission, the baseband processor 1l-20 may generate complex symbols by encoding and modulating a transmission bit string, may map the complex symbols to subcarriers, and may then configure OFDM symbols through an inverse fast Fourier transform (IFFT) operation and cyclic prefix (CP) insertion. In addition, during data reception, the baseband processor 1l-20 may divide the baseband signal provided from the RF processor 1l-10 into units of OFDM symbols, may reconstruct the signals mapped to the subcarriers through a fast Fourier transform (FFT) operation, and may then reconstruct the received bit string through demodulation and decoding.

In yet another embodiment, the baseband processor 1l-20 and the RF processor 1l-10 may transmit or receive signals as described above. Accordingly, the baseband processor 1l-20 or the RF processor 1l-10 may be referred to as a transmitter, a receiver, a transceiver, or a communication unit. Further, at least one of the baseband processor 1l-20 and the RF processor 1l-10 may include multiple communication modules to support multiple different radio access technologies. In addition, at least one of the baseband processor 1l-20 and the RF processor 1l-10 may include different communication modules to process signals of different frequency bands. The different radio access technologies may include a wireless local area network (LAN) (e.g., Institute of Electrical and Electronics Engineers (IEEE) 802.11), a cellular network (e.g. LTE), and the like. In addition, the different frequency bands may include a super high frequency (SHF) (e.g., 2.NRHz or NRhz) band and a millimeter wave (e.g., 60 GHz) band.

In an embodiment, the storage 1l-30 may store data such as a basic program, an application program, and configuration information for the operation of the UE. In particular, the storage 1l-30 may store information related to a second access node configured to perform wireless communication using a second wireless access technology. In addition, the storage 1l-30 may provide stored data according to a request from the controller 1l-40.

In another embodiment, the controller 1l-40 may control overall operations of the UE. The controller 1l-40 may transmit or receive signals through the baseband processor 1l-20 or the RF processor 1l-10. In addition, the controller 1l-40 may record and read data in the storage 1l-30. To this end, the controller 1l-40 may include at least one processor.

The controller 1*l*-40 may include a communication processor (CP) for performing control for communication and an application processor (AP) for controlling an upper layer such as an application program.

Figure 13:
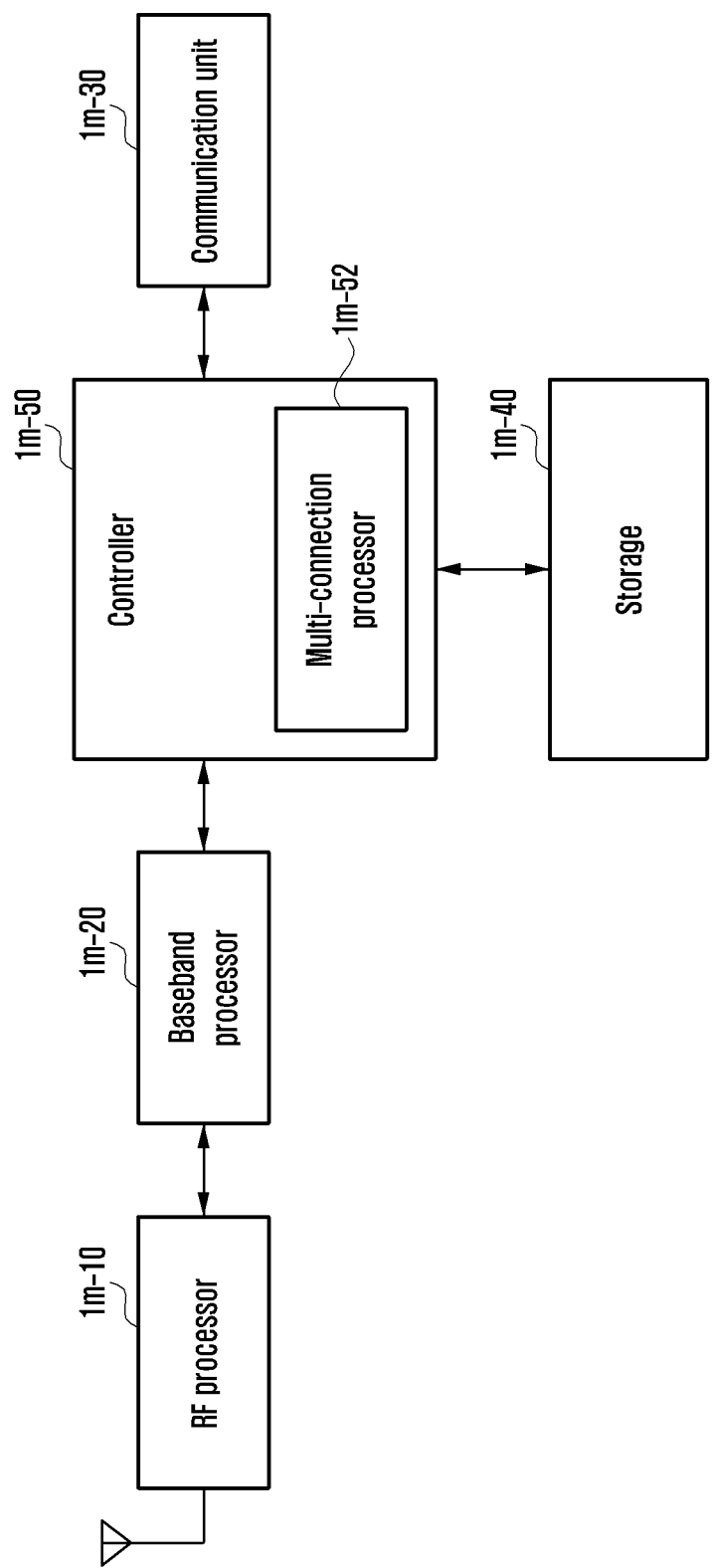
FIG. 13 is a block diagram illustrating the configuration of an NR base station according to an embodiment of the disclosure.

FIG. 13 is a block diagram illustrating the configuration of an NR base station according to an embodiment of the disclosure.

Referring to FIG. 13, the base station may include an RF processor 1*m*-10, a baseband processor 1*m*-20, a backhaul communication unit 1*m*-30, a storage 1*m*-40, a controller 1*m*-50 (for example, at least one processor), and a multi-connection processor 1*m*-52.

In an embodiment, the RF processor 1*m*-10 may perform a function for transmitting or receiving a signal through a wireless channel such as band conversion, amplification, and the like of a signal. The RF processor 1*m*-10 may up-convert a baseband signal provided from the baseband processor 1*m*-20 into an RF band signal to transmit the RF band signal through an antenna, and may down-convert the RF band signal received through the antenna into a baseband signal. The RF processor 1*m*-10 may include a transmission filter, a reception filter, an amplifier, a mixer, an oscillator, a DAC, an ADC, and the like. In the drawing, only one antenna is shown, but the first access node may be provided with multiple antennas. In addition, the RF processor 1*m*-10 may include multiple RF chains. In addition, the RF processor 1*m*-10 may perform beamforming. For the beamforming, the RF processor 1*m*-10 may adjust the phase and magnitude of each of signals transmitted and received through multiple antennas or antenna elements. The RF processor may perform a downlink MIMO operation by transmitting one or more layers.

In another embodiment, the baseband processor 1*m*-20 may perform a conversion function between a baseband signal and a bit string according to a physical layer standard of a first radio access technology. For example, during data transmission, the baseband processor 1*m*-20 may generate complex symbols by encoding and modulating a transmission bit string. In addition, during data reception, the baseband processor 1*m*-20 may reconstruct a received bit string by demodulating and decoding the baseband signal provided from the RF processor 1*m*-10. For example, according to an OFDM scheme, during data transmission, the baseband processor 1*m*-20 may generate complex symbols by encoding and modulating a transmission bit string, may map the complex symbols to subcarriers, and may then configure OFDM symbols through IFFT operation and CP insertion. In addition, during data reception, the baseband processor 1*m*-20 may divide the baseband signal provided from the RF processor 1*m*-10 in units of OFDM symbols, may reconstruct signals mapped to the subcarriers through the FFT operation, and may then reconstruct the received bit string through demodulation and decoding. The baseband processor 1*m*-20 or the RF processor 1*m*-10 may transmit or receive signals as described above. Accordingly, the baseband processor 1*m*-20 or the RF processor 1*m*-10 may be referred to as a transmitter, a receiver, a transceiver, a communication unit, or a wireless communication unit.

In yet another embodiment, the backhaul communication unit 1*m*-30 may provide an interface for communicating with other nodes in a network. In other words, the backhaul communication unit 1*m*-30 converts a bit string, which is transmitted from the main base station to another node, for example, an auxiliary base station, a core network, etc. into a physical signal, and converts a physical signal received from the other node into a bit string.

In an embodiment, the storage 1*m*-40 may store data such as a basic program, an application program, and configuration information for the operation of a base station. In particular, the storage 1*m*-40 may store information on a bearer assigned to a connected UE, a measurement result reported from the connected UE, and the like. Further, the storage 1*m*-40 may store information that is a criterion for determining whether to provide or terminate multiple connections to the UE. In addition, the storage 1*m*-40 may provide stored data according to a request from the controller 1*m*-50.

In another embodiment, the controller 1*m*-50 may control overall operations of the main base station. The controller 1*m*-50 may transmit or receive signals through the baseband processor 1*m*-20 or the RF processor 1*m*-10 or through the backhaul communication unit 1*m*-30. In addition, the controller 1*m*-50 may record and read data in the storage 1*m*-40. To this end, the controller 1*m*-50 may include at least one processor. In the above-described detailed embodiments, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first base station, the method comprising:
    transmitting, to a second base station, a request message to add the second base station for dual-connectivity (DC);
    transmitting, to a terminal, a radio resource control (RRC) message including cell group configuration information for the second base station and a gap configuration associated with switching;
    and
    transmitting, to the second base station, a message including the gap configuration associated with switching,
    wherein a gap for switching from a first network associated with a first universal subscriber identity module (USIM) to a second network associated with a second USIM is indicated by the gap configuration associated with switching.

2. The method of claim 1,
    wherein a reception operation of the terminal except for cell identification, a measurement, monitoring for paging, and system information acquisition is not performed during the gap for switching, and
    wherein the message is an inter-node RRC message.

3. The method of claim 1, further comprising:
    transmitting, to the terminal, configuration information for configuring to provide a preference on the MUSIM gap for switching; and
    receiving, from the terminal, assistance information including the preference on the gap for switching based on the configuration information,
    wherein the gap for switching is determined based on the assistance information.

4. The method of claim 1,
wherein a random access procedure with the terminal is performed during the gap for switching.

5. A method performed by a terminal, the method comprising:
receiving, from a first base station, a radio resource control (RRC) message including cell group configuration information for a second base station of dual-connectivity (DC) and a gap configuration associated with switching; and
identifying a gap for switching from a first network associated with a first universal subscriber identity module (USIM) to a second network associated with a second USIM based on the gap configuration associated with switching.

6. The method of claim 5,
wherein an inter-node RRC message including the gap configuration associated with switching is transmitted from the first base station to the second base station, and
wherein a reception operation except for cell identification, a measurement, monitoring for paging, and system information acquisition is not performed during the gap for switching.

7. The method of claim 5, further comprising:
receiving, from the first base station, configuration information for configuring to provide a preference on the gap for switching; and
transmitting, to the first base station, assistance information including the preference on the gap for switching based on the configuration information,
wherein the gap for switching is determined based on the assistance information.

8. The method of claim 5,
wherein a random access procedure is performed during the gap for switching.

9. A method performed by a second base station, the method comprising:
receiving, from a first base station, a request message for adding the second base station to a terminal for dual-connectivity (DC); and
receiving, from the first base station, a message including a gap configuration associated with switching,
wherein a gap for switching from a first network associated with a first universal subscriber identity module (USIM) to a second network associated with a second USIM is indicated by the gap configuration associated with switching.

10. The method of claim 9, wherein the message is an inter-node radio resource control (RRC) message.

11. A first base station comprising:
a transceiver; and
at least one processor configured to:
control the transceiver to transmit, to a second base station, a request message to add the second base station for dual-connectivity (DC),
control the transceiver to transmit, to a terminal, a radio resource control (RRC) message including cell group configuration information for the second base station and a gap configuration associated with switching first USIM,
and
control the transceiver to transmit, to the second base station, a message including the gap configuration associated with switching,
wherein a gap for switching from a first network associated with a first universal subscriber identity module (USIM) to a second network associated with a second USIM is indicated by the gap configuration associated with switching.

12. The first base station of claim 11,
wherein a reception operation of the terminal except for cell identification, a measurement, monitoring for paging, and system information acquisition is not performed during the gap for switching, and
wherein the message is an inter-node RRC message.

13. The first base station of claim 11,
wherein the at least one processor is further configured to control the transceiver to transmit, to the terminal, configuration information for configuring to provide a preference on the gap for switching, control the transceiver to receive, from the terminal, assistance information including the preference on the gap for switching based on the configuration information, and determine the gap for switching based on the assistance information.

14. The first base station of claim 11,
wherein a random access procedure with the terminal is performed during the gap for switching.

15. A terminal comprising:
a transceiver; and
at least one processor configured to:
control the transceiver to receive, from a first base station, a radio resource control (RRC) message including cell group configuration information for a second base station of dual-connectivity (DC) and a gap configuration associated with switching, and
identify a gap for switching from a first network associated with a first universal subscriber identity module (USIM) to a second network associated with a second USIM based on the gap configuration associated with switching.

16. The terminal of claim 15,
wherein an inter-node RRC message including the gap configuration associated with switching is transmitted from the first base station to the second base station, and
wherein a reception operation except for cell identification, a measurement, monitoring for paging, and system information acquisition is not performed during the gap for switching.

17. The terminal of claim 15,
wherein the at least one processor is further configured to control the transceiver to receive, from the first base station, configuration information for configuring to provide a preference on the gap for switching, and control the transceiver to transmit, to the first base station, assistance information including the preference on the gap for switching based on the configuration information, and
wherein the gap for switching is determined based on the assistance information.

18. The terminal of claim 15,
wherein a random access procedure is performed during the gap for switching.

19. A second base station comprising:
a transceiver; and
at least one processor configured to:
control the transceiver to receive, from a first base station, a request message for adding the second base station to a terminal for dual-connectivity (DC), and
control the transceiver to receive, from the first base station, a message including a gap configuration associated with switching, wherein a gap for switching from a first network associated with a first universal subscriber identity module (USIM) to a second network associated with a second USIM is indicated by the gap configuration associated with switching.

20. The second base station of claim 19, wherein the message is an inter-node radio resource control (RRC) message.

* * * * *